US012372904B2

(12) United States Patent
Ikeno

(10) Patent No.: US 12,372,904 B2
(45) Date of Patent: Jul. 29, 2025

(54) HEATING UNIT INCLUDING CABLE GUIDE FOR RESTRICTING TEMPERATURE SENSOR CABLES FROM CONTACTING HOLDER THAT SUPPORTS HEATER

(71) Applicant: BROTHER KOGYO KABUSHIKI KAISHA, Nagoya (JP)

(72) Inventor: Yuichi Ikeno, Maibara (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/408,711

(22) Filed: Jan. 10, 2024

(65) Prior Publication Data

US 2024/0288808 A1 Aug. 29, 2024

(30) Foreign Application Priority Data

Feb. 28, 2023 (JP) ................................ 2023-030316

(51) Int. Cl.
*G03G 15/20* (2006.01)
*H05B 1/02* (2006.01)

(52) U.S. Cl.
CPC ..... *G03G 15/2053* (2013.01); *G03G 15/2017* (2013.01); *G03G 15/2039* (2013.01); *H05B 1/0241* (2013.01); *G03G 2215/2035* (2013.01)

(58) Field of Classification Search
CPC ........... G03G 15/2017; G03G 15/2039; G03G 15/2053; G03G 2215/2035; H05B 1/0241; H05B 3/20
USPC .................................... 399/69, 329; 219/216
See application file for complete search history.

(56) References Cited

U.S. PATENT DOCUMENTS

| | | | | |
|---|---|---|---|---|
| 2002/0118978 A1* | 8/2002 | Nakamura | G03G 15/2017 | 399/69 |
| 2016/0252856 A1* | 9/2016 | Suzuki | G03G 15/2053 | 399/329 |
| 2019/0004458 A1* | 1/2019 | Muramatsu | H02H 5/042 | |
| 2020/0183310 A1 | 6/2020 | Tanto | | |
| 2021/0318647 A1* | 10/2021 | Ikeno | G03G 15/2028 | |
| 2023/0034177 A1* | 2/2023 | Kohama | G03G 15/2039 | |
| 2023/0168612 A1* | 6/2023 | Muramatsu | G03G 15/2053 | 399/69 |
| 2023/0367246 A1* | 11/2023 | Furuichi | G03G 15/2017 | |

FOREIGN PATENT DOCUMENTS

| | | |
|---|---|---|
| JP | 2020091433 A | 6/2020 |
| JP | 2020101677 A | 7/2020 |

* cited by examiner

*Primary Examiner* — Robert B Beatty
(74) *Attorney, Agent, or Firm* — Element IP, PLC

(57) ABSTRACT

A heating unit includes a heater, an endless belt circularly movable around the heater, a temperature sensing element configured to detect a temperature of the heater, a cable connected to the temperature sensing element, a holder holding the heater and the temperature sensing element, and a cable guide holding the cable. The heater includes a base plate, and a resistance heating element formed on the base plate. The endless belt has an inner peripheral surface in contact with a first surface of the heater. The temperature sensing element is arranged to face a second surface of the heater opposite the first surface in the thickness direction. The holder includes a support wall supporting the second surface of the heater. The cable guide includes a partitioning wall positioned between at least a part of the cable and the support wall.

14 Claims, 19 Drawing Sheets

HEATING UNIT INCLUDING CABLE GUIDE FOR RESTRICTING TEMPERATURE SENSOR CABLES FROM CONTACTING HOLDER THAT SUPPORTS HEATER

REFERENCE TO RELATED APPLICATIONS

This application claims priority from Japanese Patent Application No. 2023-030316 filed on Feb. 28, 2023. The entire content of the priority application is incorporated herein by reference.

BACKGROUND ART

There has been known a heating unit that includes a flat-shaped heater, an endless belt circularly movable around the heater, a temperature sensor configured to detect a temperature of the heater, a cable connected to the temperature sensor, and a holder retaining the heater.

SUMMARY

In the conventional heating unit described above, a support wall of the holder supporting the heater is likely to become extremely hot. As such, preferably, contact between the cable and the support wall of the holder be avoided.

In view of the foregoing, it is an object of the present disclosure to provide a heating unit that can suppress contact between a cable and a support wall of the holder.

In order to attain the above and other object, according to one aspect, the present disclosure provides a heating unit including a heater, an endless belt, a temperature sensing element, a cable, a holder, and a cable guide. The heater has a first surface and a second surface opposite each other. The heater includes: a base plate elongated in a long-side direction and having a thickness in a thickness direction perpendicular to the second surface; and a resistance heating element provided on the base plate. The endless belt is circularly movable around the heater. The endless belt has an inner peripheral surface in contact with the first surface of the heater. The temperature sensing element is configured to detect a temperature of the heater and is arranged to face the second surface of the heater in the thickness direction. The cable is connected to the temperature sensing element. The holder holds the heater and the temperature sensing element. The holder includes a support wall supporting the second surface of the heater. The cable guide holds the cable. The cable guide includes a partitioning wall positioned between at least a part of the cable and the support wall in the thickness direction.

With the above structure, since the cable guide holding the cable has the partitioning wall arranged between at least a part of the cable and the support wall of the holder, contact between the cable and the support wall can be restrained.

DESCRIPTION

Hereinafter, a heating unit 1 according to one embodiment of the present disclosure will be described with reference to FIGS. 1 through 19B.

Figure 1:
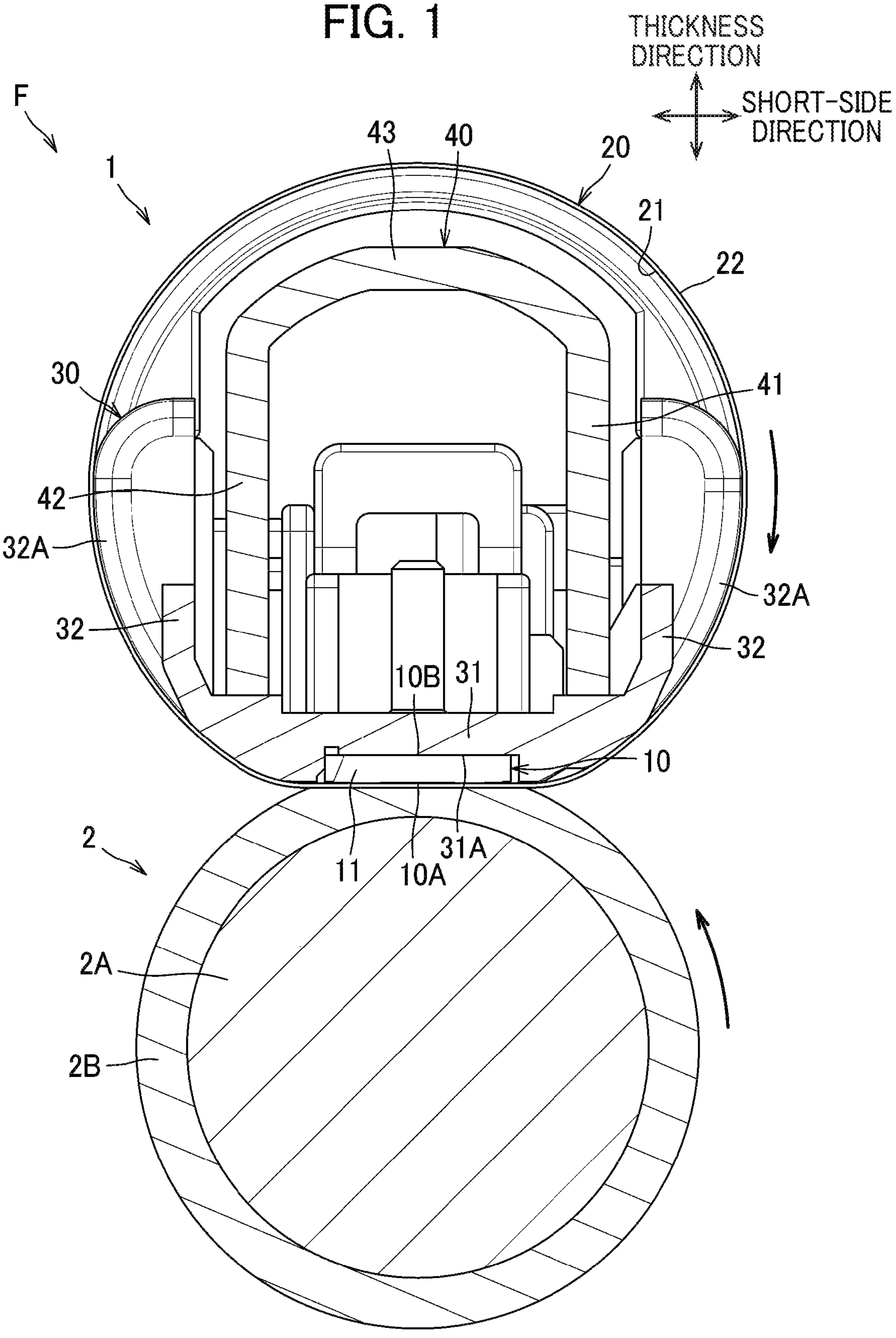
FIG. 1 is a vertical cross-sectional view of a fixing device according to one embodiment.

The heating unit 1 according to the embodiment is incorporated in a fixing device F illustrated in FIG. 1. The fixing device F may be used in an electro-photographic type image forming apparatus or in a foil transferring device configured to transfer a foil through heat. As illustrated in FIG. 1, the fixing device F includes the heating unit 1 according to the embodiment, and a pressure roller 2.

When employed in an image forming apparatus, the fixing device F is configured to fix a toner image onto a recording medium, such as a sheet, while conveying the recording medium between the heating unit 1 and the pressure roller 2. When employed in a foil transferring device, the fixing device F is configured to transfer a foil onto a recording medium while conveying the recording medium between the heating unit 1 and the pressure roller 2.

The heating unit 1 includes a heater 10, a belt 20, a holder 30, and a stay 40.

The heater 10 is configured to heat a recording medium that is conveyed between the heating unit 1 and the pressure roller 2. The heater 10 has a first surface 10A and a second surface 10B. The first surface 10A is a surface in sliding contact with an inner peripheral surface of the belt 20. The second surface 10B is a surface opposite the first surface 10A.

Figure 2:
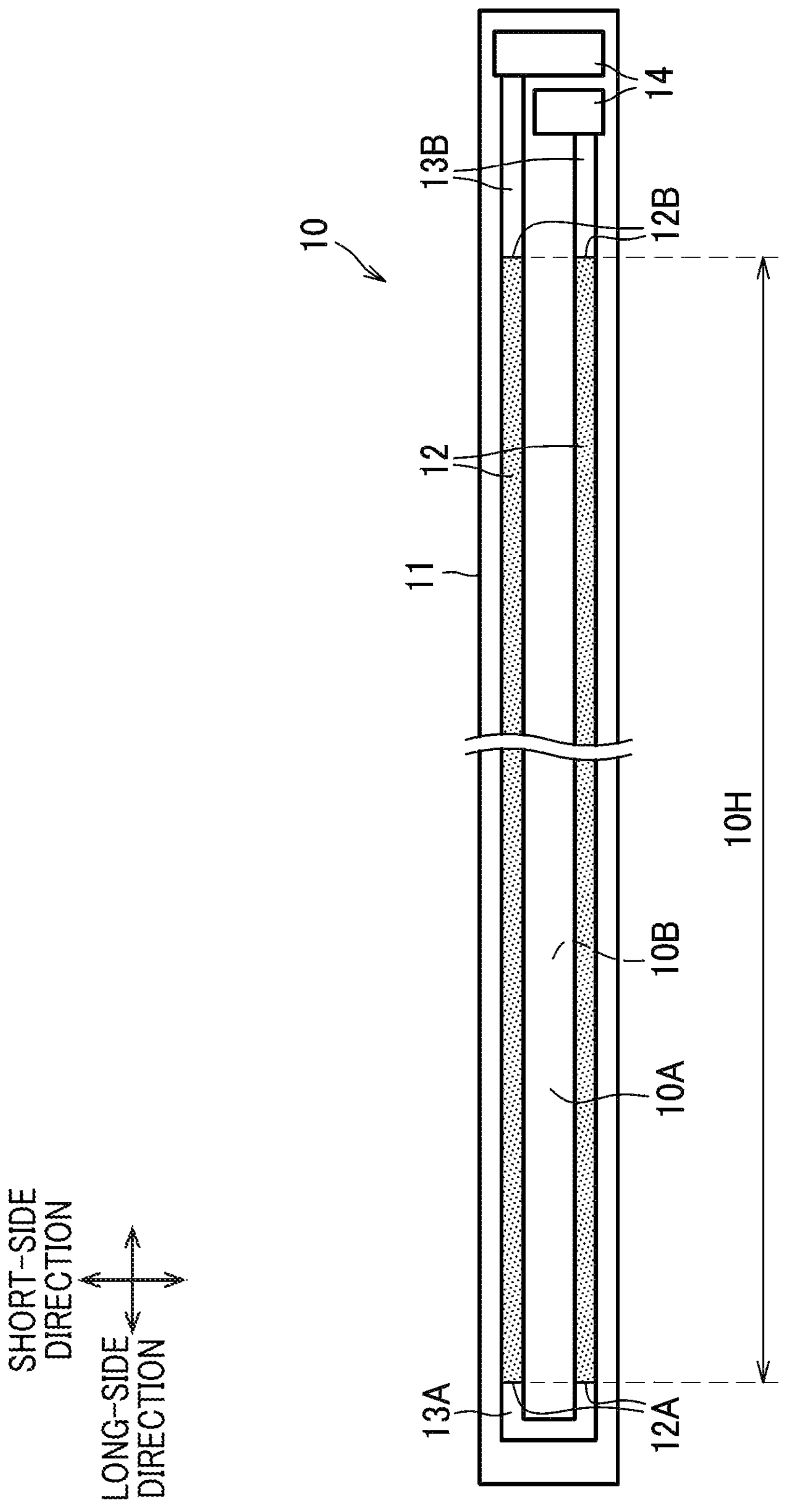
FIG. 2 is a view illustrating a first surface of a heater of the fixing device.

As illustrated in FIG. 2, the heater 10 includes a base plate 11, two resistance heating elements 12, a lead wire 13A, two lead wires 13B, and two power supply terminals 14.

The base plate 11 is a rectangular-shaped plate having two long sides and two short sides. In the present embodiment, the base plate 11 is made of ceramic, and the heater 10 is a so-called ceramic heater.

In the following description, a direction in which the long side of the rectangular base plate 11 extends will be referred to as a "long-side direction" and a direction in which the short side of the rectangular base plate 11 extends will be referred to as a "short-side direction." Further, a thickness direction of the base plate 11, which is perpendicular to both the long-side direction and the short-side direction, will be referred to as a "thickness direction." The thickness direction is also orthogonal to the second surface 10B of the heater 10.

The resistance heating elements 12, the lead wires 13A and 13B, and the power supply terminals 14 are positioned on the base plate 11. Specifically, the resistance heating elements 12, the lead wires 13A and 13B, and the power supply terminals 14 are provided on the first surface 10A of the heater 10.

The resistance heating elements 12 are formed by printing. In the present embodiment, two resistance heating elements 12 are provided. The resistance heating elements 12 respectively extend in the long-side direction in parallel to each other, and are arranged spaced apart from each other in the short-side direction.

Each of the two resistance heating elements 12 has one end 12A and another end 12B in the long-side direction. The one ends 12A of the respective resistance heating elements 12 are connected to each other by the lead wire 13A. The other end 12B of each resistance heating element 12 is connected to one of the two lead wires 13B. Another end of each lead wire 13B is connected to one of the two power supply terminals 14. That is, each power supply terminal 14 is electrically connected to the corresponding resistance heating element 12 through the corresponding lead wire 13B. The power supply terminals 14 are both connected to a connector 50 (see FIG. 3) for supplying power to the resistance heating elements 12.

Incidentally, the number and arrangement of the resistance heating elements 12 are not specifically limited. Further, the resistance heating elements 12 may be configured of: a first resistance heating element configured to generate a greater amount of heat at a longitudinal center portion thereof than at longitudinal end portions thereof, and a second resistance heating element configured to generate a greater amount of heat at longitudinal end portions thereof than at a longitudinal center portion thereof. In this case, the first and second resistance heating elements may be controlled individually to control distribution of heat generation in the long-side direction.

As illustrated in FIG. 1, the belt 20 is an endless belt circularly movable around the heater 10. The belt 20 has an inner peripheral surface 21 and an outer peripheral surface 22. The inner peripheral surface 21 of the belt 20 is in contact with the first surface 10A of the heater 10, and the outer peripheral surface 22 is in contact with the pressure roller 2. The outer peripheral surface 22 of the belt 20 is also configured to contact a recording medium to be conveyed between the heating unit 1 and the pressure roller 2.

The holder 30 supports the heater 10. Specifically, the holder 30 supports the second surface 10B of the heater 10. In the present embodiment, the holder 30 is made of resin. The holder 30 includes a support wall 31 and a plurality of belt guides 32.

The support wall 31 has a heater positioning groove 31A extending in the long-side direction. The heater 10 is arranged in the heater positioning groove 31A. The support wall 31 supports the second surface 10B of the heater 10 in the thickness direction.

The belt guides 32 are provided on each end of the support wall 31 in the short-side direction such that the belt guides 32 are arrayed in the long-side direction. Each belt guide 32 has a pair of guide ribs 32A protruding outward in the short-side direction. The guide ribs 32A are thus arrayed in the long-side direction (see FIG. 3). Each guide rib 32A has a shape in conformance with a curvature of the inner peripheral surface 21 of the belt 20. The inner peripheral surface 21 of the belt 20 is in contact with the respective guide ribs 32A. The belt 20 is circularly movable around the heater 10 and the holder 30 while being guided by the guide ribs 32A.

The stay 40 supports the holder 30. The stay 40 includes a first stay wall 41, a second stay wall 42, and a third stay wall 43.

The first stay wall 41 and the second stay wall 42 extend in the long-side direction and in the thickness direction, and are arranged to be spaced apart from each other in the short-side direction. The third stay wall 43 connects the first stay wall 41 to the second stay wall 42. Specifically, the third stay wall 43 connects one end of the first stay wall 41 (the end farther from the heater 10 in the thickness direction) to one end of the second stay wall 42 (the end farther from the heater 10 in the thickness direction).

The stay 40 supports the holder 30 from a side opposite the side where the heater 10 is positioned in the thickness direction. That is, the stay 40 is positioned opposite the heater 10 with respect to the holder 30 in the thickness direction. Specifically, respective ends of the first stay wall 41 and the second stay wall 42 (the ends closer to the heater 10 in the thickness direction) are in contact with one surface of the support wall 31, the one surface being opposite a surface of the support wall 31 on which the heater 10 is positioned in the thickness direction. The stay 40 has a rigidity higher than a rigidity of the holder 30 made of resin. In the present embodiment, the stay 40 is made of metal. Specifically, the stay 40 is formed by bending a steel plate into a U-shape.

The pressure roller 2 includes a shaft 2A and a roller body 2B. The shaft 2A is made of metal, for example. The roller body 2B is made of rubber, for example, and is provided over the shaft 2A. The pressure roller 2 is arranged to face the heating unit 1 such that the belt 20 is nipped between the pressure roller 2 and the heater 10. In the fixing device F, one of the heating unit 1 and the pressure roller 2 is urged toward the remaining one of the heating unit 1 and the pressure roller 2.

Figure 3:
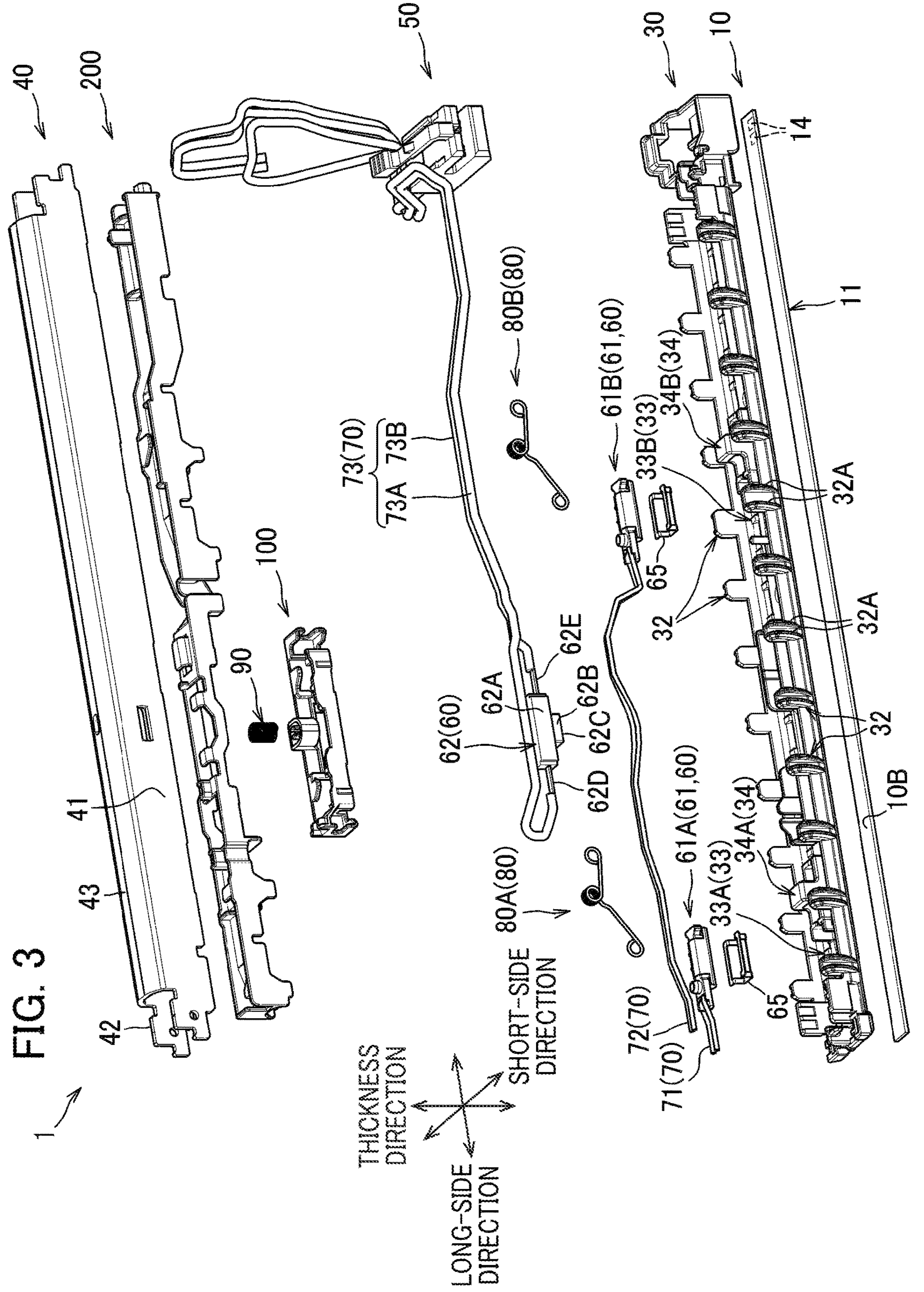
FIG. 3 is an exploded perspective view of a heating unit of the fixing device.

As illustrated in FIG. 3, the heating unit 1 further includes a temperature sensing element 60, a cable 70, two torsion coil springs 80, a compression coil spring 90, a cover 100, and a cable guide 200.

The temperature sensing element 60 is configured to detect a temperature of the heater 10. The temperature sensing element 60 includes a pair of thermistors 61 and a thermostat 62.

The thermistors 61 are temperature sensors configured to detect the temperature of the heater 10. Specifically, the two thermistors 61 are a side thermistor 61A and a center thermistor 61B. The side thermistor 61A is positioned at one end portion of the heating unit 1 (heater 10) in the long-side direction, and the center thermistor 61B positioned on a center portion of the heating unit 1 (heater 10) in the long-side direction.

The thermostat 62 is a protection element configured to shut off power supply to the resistance heating elements 12 (see FIG. 2) when the temperature of the heater 10 exceeds a threshold value for safety reasons. The thermostat 62 is positioned between the side thermistor 61A and the center thermistor 61B in the long-side direction.

The thermostat 62 houses therein a shut-off mechanism including a bimetal. The thermostat 62 includes a case 62A accommodating the shut-off mechanism therein, and a heat-sensitive portion 62B protruding out from the case 62A. The heat-sensitive portion 62B is arranged on the holder 30 to face the second surface 10B of the heater 10 in the thickness direction. Specifically, the heat-sensitive portion 62B has a heat-sensitive surface 62C facing the second surface 10B of the heater 10 in the thickness direction.

The thermostat 62 further includes a first terminal 62D and a second terminal 62E. The first terminal 62D is provided at the case 62A to constitute one end portion of the thermostat 62 in the long-side direction. The second terminal 62E is provided at the case 62A to constitute another end portion of the thermostat 62 in the long-side direction. The first terminal 62D and the second terminal 62E are positioned opposite each other with respect to the heat-sensitive surface 62C (heat-sensitive portion 62B) in the long-side direction.

The cable 70 is a bundle of cables connected to the temperature sensing element 60. The cable 70 includes a side thermistor cable 71, a center thermistor cable 72, and a pair of thermostat cables 73.

The side thermistor cable 71 is connected to the side thermistor 61A. The center thermistor cable 72 is connected to the center thermistor 61B.

The thermostat cables 73 are connected to the thermostat 62. Specifically, the thermostat cables 73 is configured of a first cable 73A and a second cable 73B. The first cable 73A is connected to the first terminal 62D of the thermostat 62, and the second cable 73B is connected to the second terminal 62E of the thermostat 62.

The side thermistor cable 71 extends from the side thermistor 61A toward one side in the long-side direction (leftward in FIG. 3), and the center thermistor cable 72 extends from the center thermistor 61B toward the one side in the long-side direction (leftward in FIG. 3). The thermostat cables 73 extends from thermostat 62 toward another side in the long-side direction (rightward in FIG. 3). The connector 50 is connected to another end portion of the heater 10 in the long-side direction where the power supply terminals 14 are positioned.

The torsion coil springs 80 urge the thermistors 61 toward the heater 10. Specifically, the torsion coil springs 80 are configured of a torsion coil spring 80A urging the side thermistor 61A toward the heater 10, and a torsion coil spring 80B urging the center thermistor 61B toward the heater 10. The compression coil spring 90 urges the thermostat 62 toward the heater 10. The cover 100 holds the thermostat 62, and the cable guide 200 retains the cable 70.

Figure 4:
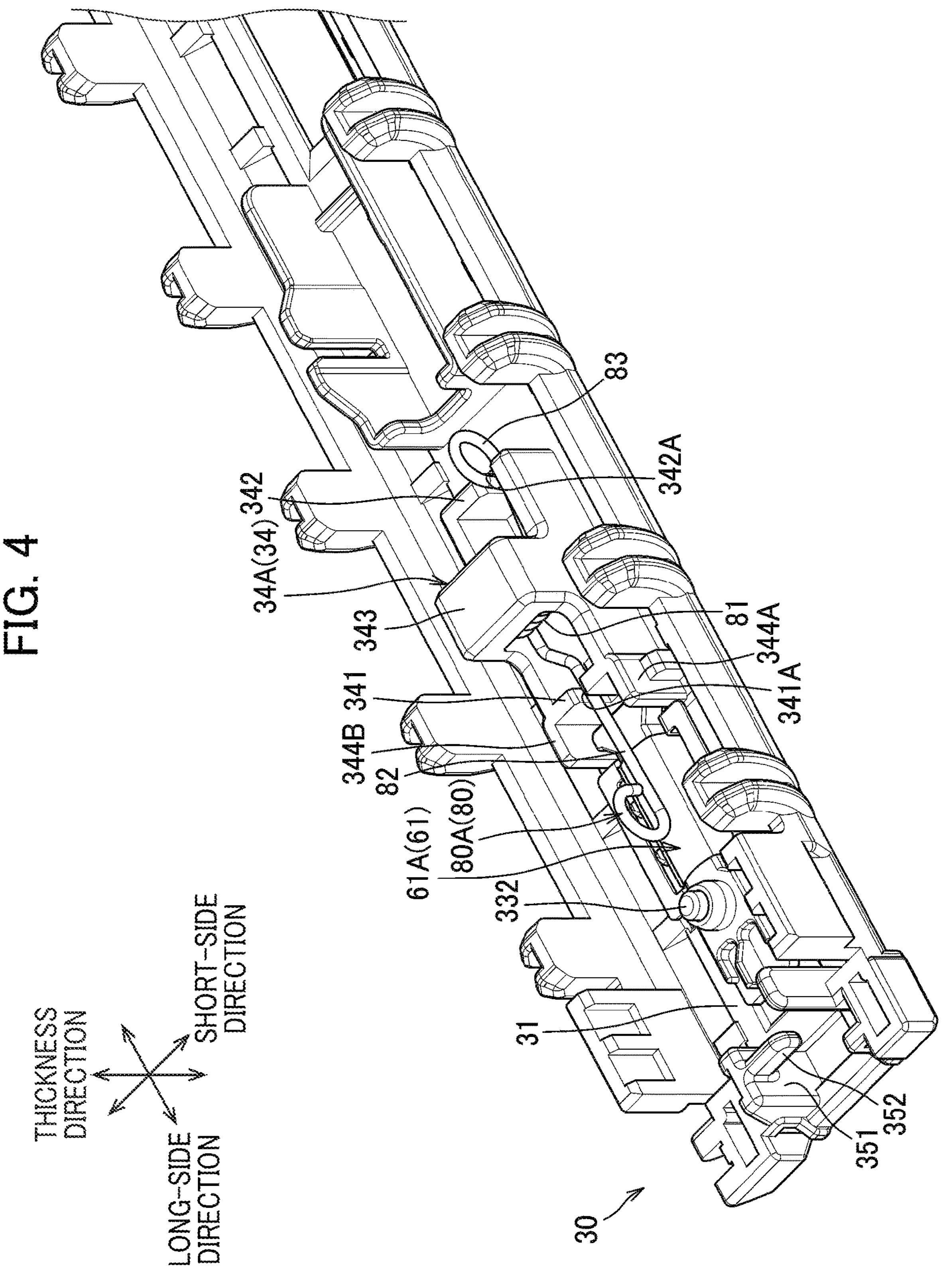
FIG. 4 is a partially-enlarged perspective view of a holder, a thermistor, and a torsion coil spring in the heating unit.
Figure 5:
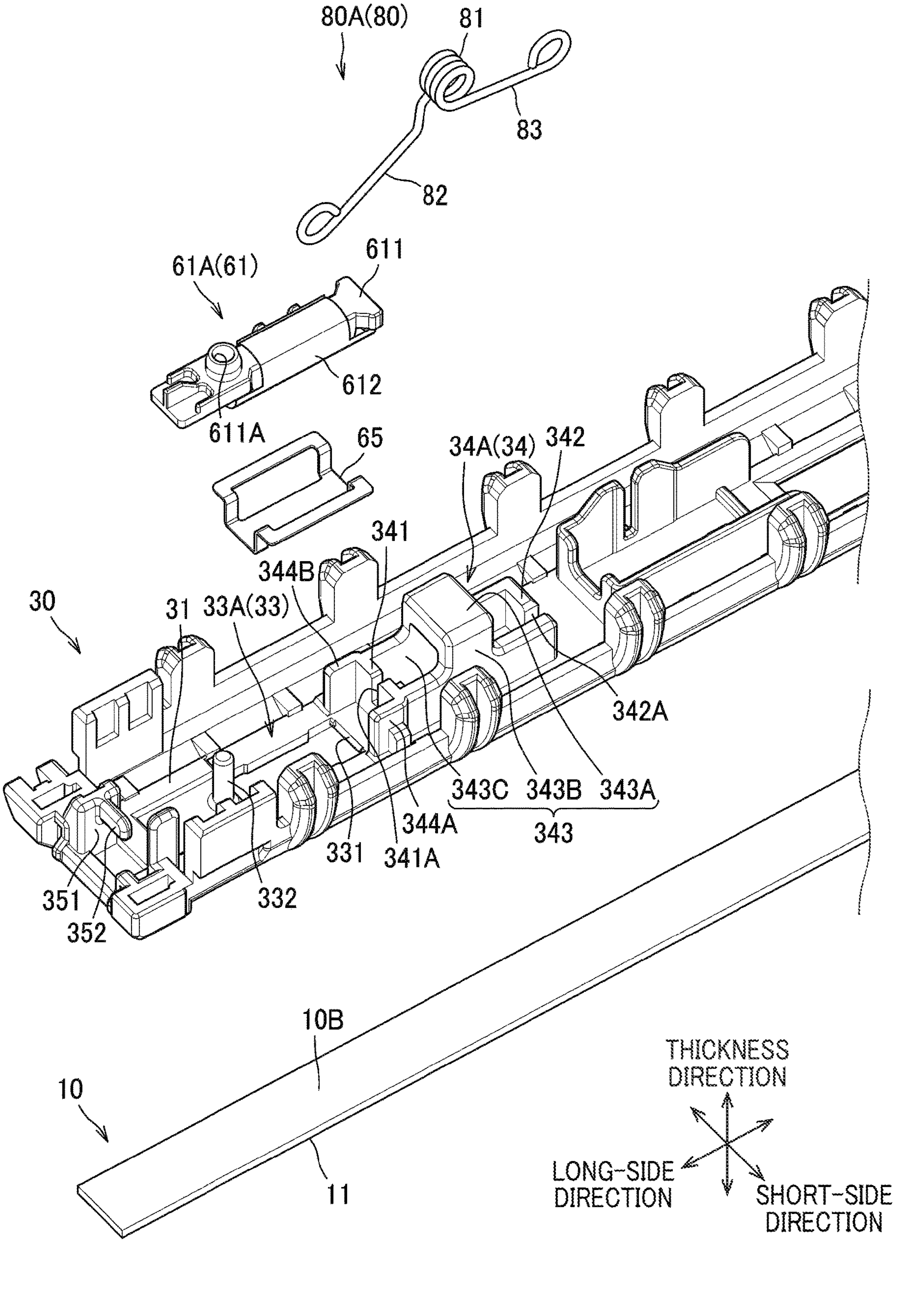
FIG. 5 is an exploded perspective view of the heater, the holder, the thermistor, and the torsion coil spring.

As illustrated in FIG. 4, the holder 30 supports the thermistors 61 and the torsion coil springs 80. Specifically, as illustrated in FIG. 5, the holder 30 further includes two sensor receiving portions 33 where the thermistors 61 are mounted, and two spring attachment portions 34 where the torsion coil springs 80 are mounted.

More specifically, as illustrated in FIG. 3, the sensor receiving portions 33 include a sensor receiving portion 33A on which the side thermistor 61A is mounted, and a sensor receiving portion 33B on which the center thermistor 61B is mounted. In the present embodiment, the sensor receiving portion 33A and the sensor receiving portion 33B have the same structure as each other. Further, the side thermistor 61A and the center thermistor 61B have the same configuration as each other. Specifically, the side thermistor 61A and the center thermistor 61B are both common parts.

The spring attachment portions 34 include a spring attachment portion 34A to which the torsion coil spring 80A is attached, and a spring attachment portion 34B to which the torsion coil spring 80B is attached. In the present embodiment, the spring attachment portions 34A and 34B have the same structure as each other. Further, the torsion coil springs 80A and 80B have the same structure as each other. Specifically, the torsion coil springs 80A and 80B are both common parts.

Hereinafter, detailed structures of the sensor receiving portions 33, the spring attachment portions 34, the thermistors 61, and the torsion coil springs 80 will be described mainly with reference to the sensor receiving portion 33A, the spring attachment portion 34A, the side thermistor 61A, and the torsion coil spring 80A.

As illustrated in FIG. 5, each sensor receiving portion 33 has a first through-hole 331 and a protrusion 332. The first through-hole 331 is a through-hole penetrating through the support wall 31 in the thickness direction. The corresponding thermistor 61 (side thermistor 61A in FIG. 5) is positioned in the first through-hole 331 together with a soaking plate 65. The soaking plate 65 is made of aluminum or an aluminum alloy.

The protrusion 332 has a solid cylindrical shape and protrudes in the thickness direction. Specifically, the protrusion 332 protrudes from the support wall 31 to extend away from the heater 10 in the thickness direction. The protrusion 332 is positioned on the one side of the first through-hole 331 in the long-side direction (leftward in FIG. 5). The spring attachment portion 34 is positioned on the other side of the first through-hole 331 in the long-side direction (rightward in FIG. 5). In other words, the first through-hole 331 is positioned between the protrusion 332 and the spring attachment portion 34 in the long-side direction.

Each thermistor 61 includes a support plate 611 supporting a thermistor element (not illustrated), and a film 612. The support plate 611 supports the thermistor element through an elastic member such as a sponge. The support plate 611 has a hole 611A through which the protrusion 332 is inserted upon attachment of the thermistor 61 to the sensor receiving portion 33. In the present embodiment, the hole 611A is a through-hole extending throughout the thickness of the support plate 611. Alternatively, the hole 611A may be a hole with a closed bottom. The film 612 is fixed to the support plate 611 such that the film 612 is wrapped over the support plate 611 and the elastic member.

Figure 6:
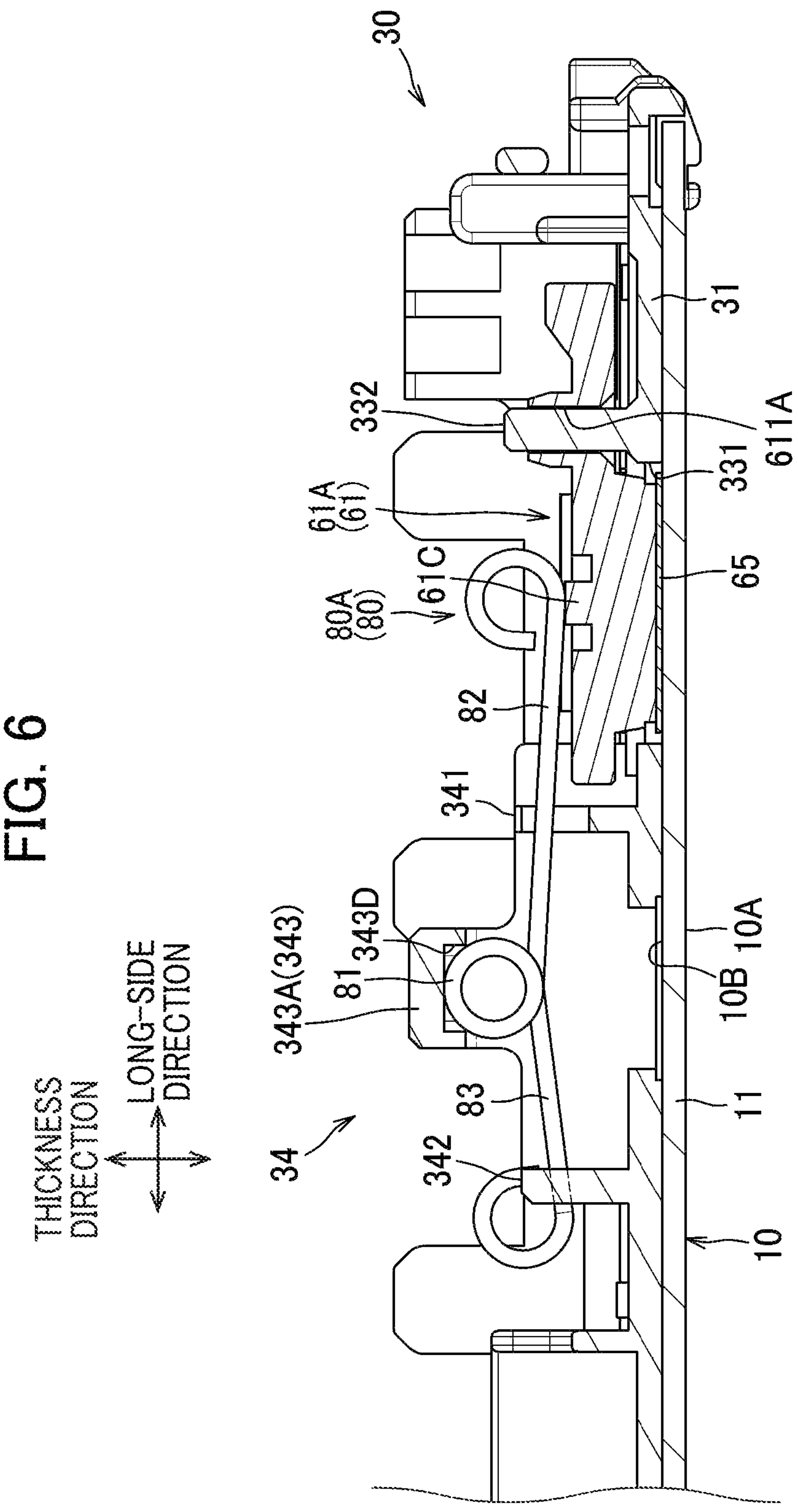
FIG. 6 is a cross-sectional view of the heater, the holder, the thermistor, and the torsion coil spring.

As illustrated in FIG. 6, each thermistor 61 faces the second surface 10B of the heater 10 in the thickness direction. In the present embodiment, the thermistor 61 is in contact with the second surface 10B of the heater 10 through the soaking plate 65.

As illustrated in FIG. 5, each torsion coil spring 80 includes a coil part 81, a first arm part 82, and a second arm part 83. The first arm part 82 extends from one end of the coil part 81. The second arm part 83 extends from another end of the coil part 81. The first arm part 82 is positioned on the one side of the coil part 81 in the long-side direction, whereas the second arm part 83 is positioned on the other side of the coil part 81 in the long-side direction. That is, the first arm part 82 is positioned opposite the second arm part 83 with respect to the coil part 81 in the long-side direction.

Each spring attachment portion 34 includes a first positioning part 341, a second positioning part 342, a spring retaining part 343, a first retaining wall 344A, and a second retaining wall 344B.

The first positioning part 341 and the second positioning part 342 are wall-like portions both protruding from the support wall 31 to extend away from the heater 10 in the thickness direction. The first positioning part 341 and the second positioning part 342 are arranged to oppose each other in the long-side direction.

The first positioning part 341 functions to fix the first arm part 82 of the corresponding torsion coil spring 80 in position with respect to the short-side direction. Specifically, the first positioning part 341 has a first groove 341A extending in the long-side direction. The first arm part 82 of the corresponding torsion coil spring 80 is fitted in the first groove 341A. The second positioning part 342 functions to fix the second arm part 83 of the corresponding torsion coil spring 80 in position with respect to the short-side direction. Specifically, the second positioning part 342 has a second groove 342A extending in the long-side direction. The second arm part 83 of the corresponding torsion coil spring 80 is fitted in the second groove 342A.

Figure 7:
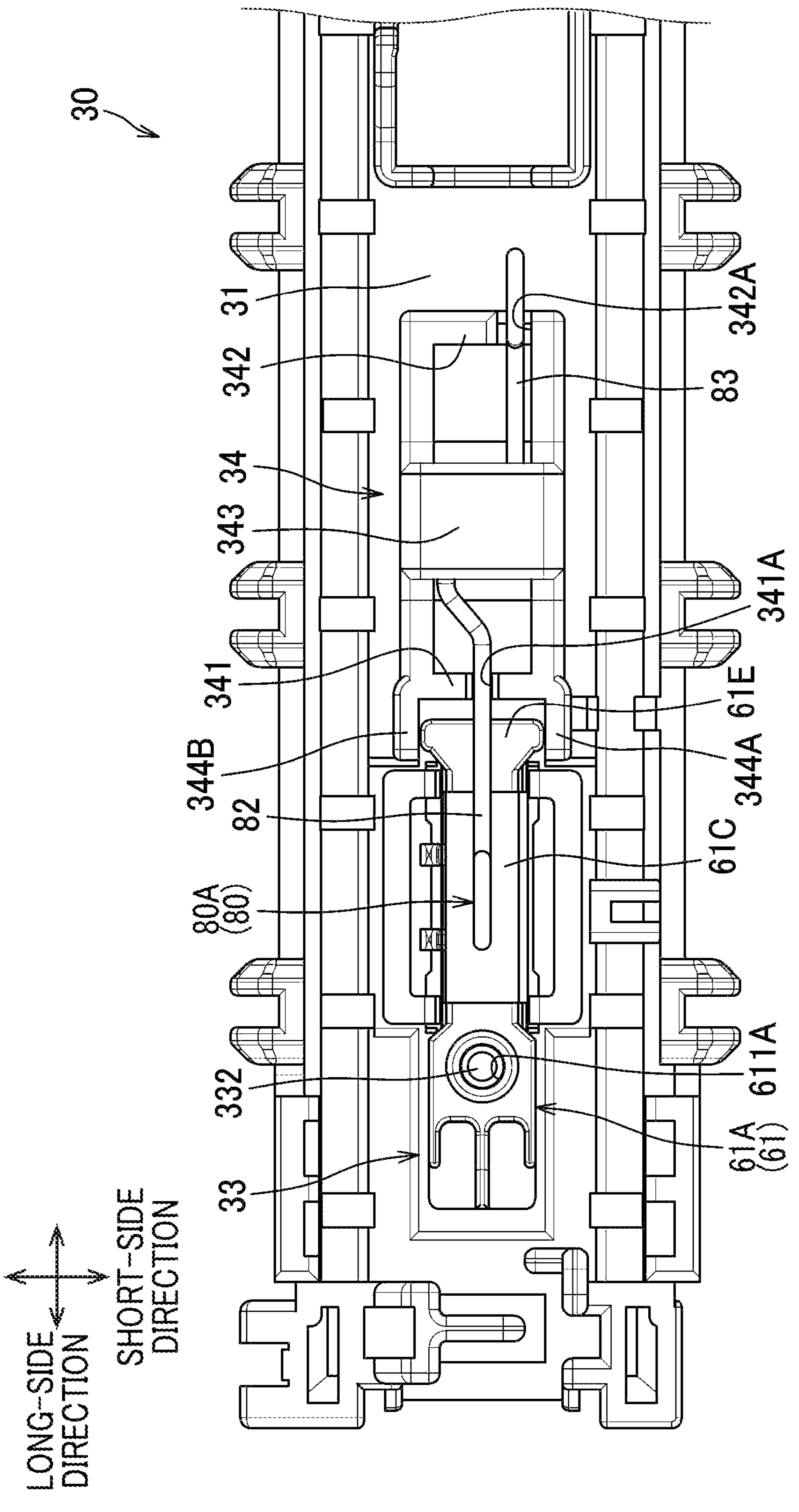
FIG. 7 is a view of the holder, the thermistor, and the torsion coil spring as viewed in a thickness direction of a base plate of the heater.

As illustrated in FIG. 7, positions of the first groove 341A and the second groove 342A are different from each other with respect to the short-side direction. Specifically, the second groove 342A is positioned further toward one side in the short-side direction (downward in FIG. 7) than the first groove 341A. In other words, the first groove 341A is positioned further toward another side in the short-side direction (upward in FIG. 7) than the second groove 342A. More specifically, the first groove 341A is positioned at a center of the first positioning part 341 in the short-side direction, while the second groove 342A is positioned at an end portion of the second positioning part 342 at the one side in the short-side direction (offset from a center of the second positioning part 342 in the short-side direction).

As illustrated in FIG. 5, each spring retaining part 343 functions to restrict the coil part 81 of the corresponding torsion coil spring 80 from moving away from the heater 10 in the thickness direction. The spring retaining part 343 includes a spring restricting wall 343A, a first connecting wall 343B, and a second connecting wall 343C.

The spring restricting wall 343A is connected to the support wall 31 by the first connecting wall 343B and the second connecting wall 343C. Each of the first connecting wall 343B and the second connecting wall 343C extends from the support wall 31 in the thickness direction so as to extend away from the heater 10. The first connecting wall 343B and the second connecting wall 343C face each other in the short-side direction.

The spring restricting wall 343A extends in the short-side direction and the long-side direction. The spring restricting wall 343A extends in the short-side direction to connect an end of the first connecting wall 343B in the thickness direction (the end farther from the heater 10) to an end of the second connecting wall 343C in the thickness direction (the end farther from the heater 10). As illustrated in FIG. 6, the spring restricting wall 343A is in contact with the coil part 81 of the corresponding torsion coil spring 80 such that the spring restricting wall 343A is positioned opposite the heater 10 with respect to the coil part 81 in the thickness direction.

The spring retaining part 343 also includes a restricting recess 343D that is formed on a surface of the spring restricting wall 343A facing the heater 10 in the thickness direction. The coil part 81 of the corresponding torsion coil spring 80 is fitted with the restricting recess 343D. This fitting of the coil part 81 with the restricting recess 343D restricts displacement of the torsion coil spring 80 in the long-side direction.

As illustrated in FIG. 7, the first retaining wall 344A and the second retaining wall 344B are arranged to oppose each other in the short-side direction. The first retaining wall 344A extends toward the one side in the short-side direction (leftward in FIG. 7) from one end of the first positioning part 341 at the one side in the short-side direction (the lower end in FIG. 7). The second retaining wall 344B extends toward the one side in the long-side direction (leftward in FIG. 7) from another end of the first positioning part 341 at the other side in the short-side direction (the upper end in FIG. 7).

In a state where each thermistor 61 is mounted on the corresponding sensor receiving portion 33, the hole 611A of the thermistor 61 receives the corresponding protrusion 332 therein for engagement therewith. Further, in the state where each thermistor 61 is mounted on the corresponding sensor receiving portion 33, an end portion 61E of the thermistor 61 (the end portion opposite the hole 611A in the long-side direction) is interposed between the first retaining wall 344A and the second retaining wall 344B in the short-side direction. In this way, the thermistor 61 is fixed in position, relative to the holder 30, in the long-side direction by the engagement between the hole 611A and the protrusion 332, as well as in the short-side direction by the engagement of the end portion 61E with the first retaining wall 344A and the second retaining wall 344B.

The first arm part 82 of each torsion coil spring 80 urges the corresponding thermistor 61 toward the heater 10 in a state where the second arm part 83 of the torsion coil spring 80 is supported on the holder 30. As illustrated in FIGS. 6 and 7, in a state where the torsion coil spring 80 is attached to the corresponding spring attachment portion 34, the first arm part 82 is fitted with the first groove 341A of the first positioning part 341; the coil part 81 is fitted in the restricting recess 343D to provide contact with the spring restricting wall 343A; and the second arm part 83 is fitted with the second groove 342A of the second positioning part 342.

Each torsion coil spring 80 is supported on the holder 30 by the fitting engagement of the second arm part 83 with the second groove 342A of the second positioning part 342, and by the contact of the coil part 81 against the spring restricting wall 343A through the fitting engagement of the coil part 81 with the restricting recess 343D. The first arm part 82 of each torsion coil spring 80 urges a center portion 61C of the corresponding thermistor 61 in the long-side direction toward the heater 10.

As illustrated in FIG. 7, the thermistor 61 and the corresponding torsion coil spring 80 are arranged linearly in the long-side direction as viewed in the thickness direction. The center portion 61C of the thermistor 61 is disposed between the spring retaining part 343 and the protrusion 332 in the long-side direction as viewed in the thickness direction. The center portion 61C of the thermistor 61 is urged by the first arm part 82 of the corresponding torsion coil spring 80.

As illustrated in FIG. 4, the holder 30 has one end portion in the long-side direction where a protruding part 351 and a cable restricting part 352 are provided. The protruding part 351 protrudes from the support wall 31 to extend away from the heater 10 in the thickness direction. Specifically, the protruding part 351 protrudes from one end portion of the support wall 31 in the long-side direction to extend away therefrom in the thickness direction (upward in FIG. 4).

The cable restricting part 352 protrudes from the protruding part 351 in the short-side direction at a position away from the heater 10 in the thickness direction. Specifically, the cable restricting part 352 protrudes toward one side in the short-side direction (toward the lower-right side in FIG. 4) from the protruding part 351 at position away from the support wall 31 in the thickness direction.

Figure 8:
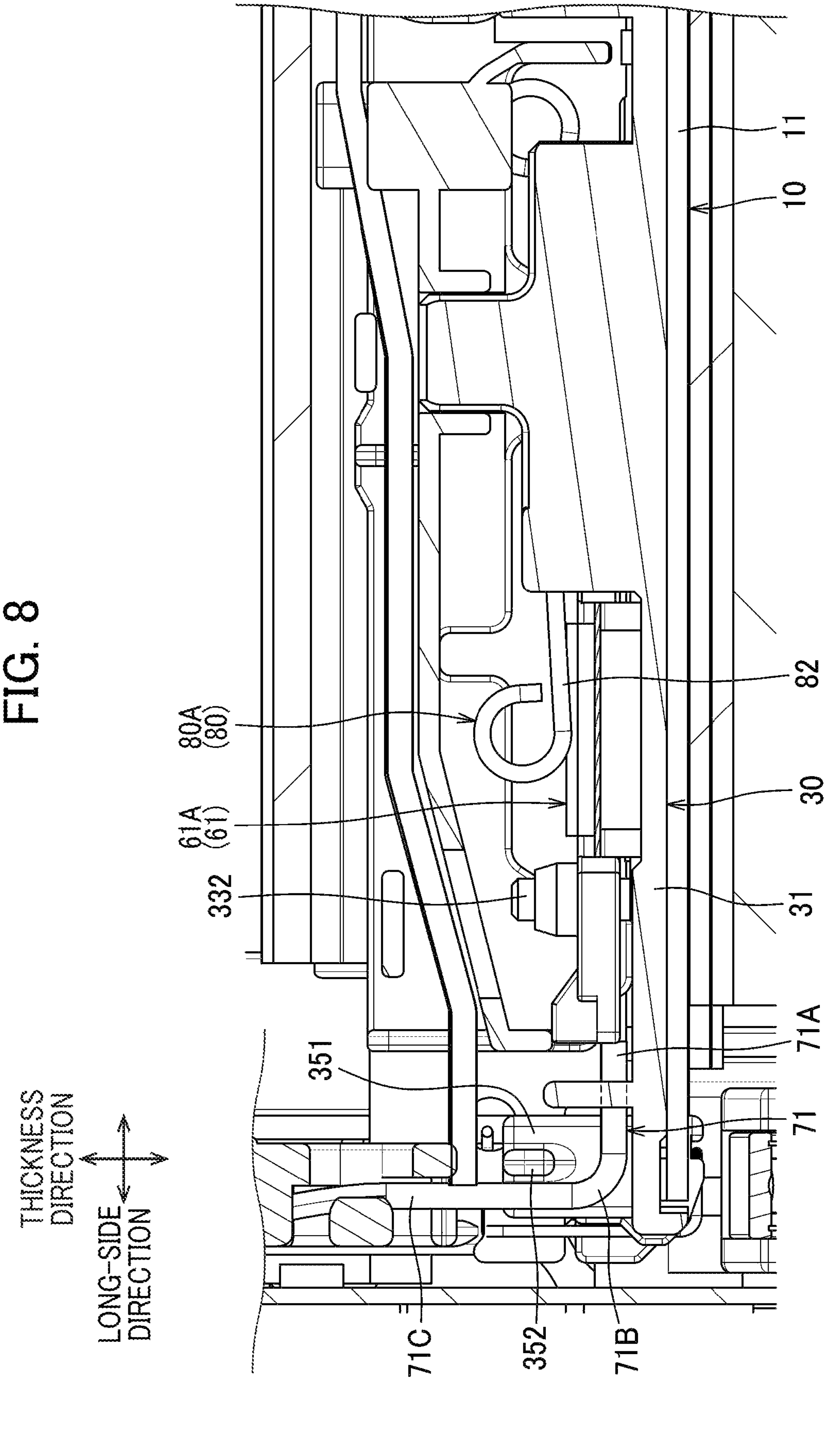
FIG. 8 is a partially-enlarged cross-sectional view illustrating arrangement of a cable restricting part of the holder and a side thermistor cable.

As illustrated in FIG. 8, the side thermistor cable 71 extends from the side thermistor 61A toward the one side in the long-side direction. Specifically, the side thermistor cable 71 extends between the heater 10 and the cable restricting part 352, more specifically, between the support wall 31 and the cable restricting part 352. The side thermistor cable 71 is arranged to have an L-shape configuration such that the side thermistor cable 71 extend in the long-side direction between the support wall 31 and the cable restricting part 352 and is then bent to extend away from the heater 10 in the thickness direction.

More specifically, the side thermistor cable 71 includes a first part 71A, a second part 71B, and a third part 71C. The first part 71A extends away from the side thermistor 61A toward the one side in the long-side direction. The second part 71B extends from an end of the first part 71A and curves to extend away from the heater 10 in the thickness direction toward the cable restricting part 352. The third part 71C extends from an end of the second part 71B in a direction away from the heater 10 with respect to the thickness direction.

The cable restricting part 352 is arranged to correspond to the curved portion of the side thermistor cable 71 in the long-side direction. Specifically, the cable restricting part 352 is arranged at the same position as the second part 71B of the side thermistor cable 71 with respect to the long-side direction. The cable restricting part 352 is also positioned adjacent to the third part 71C of the side thermistor cable 71 in the long-side direction.

Figure 9:
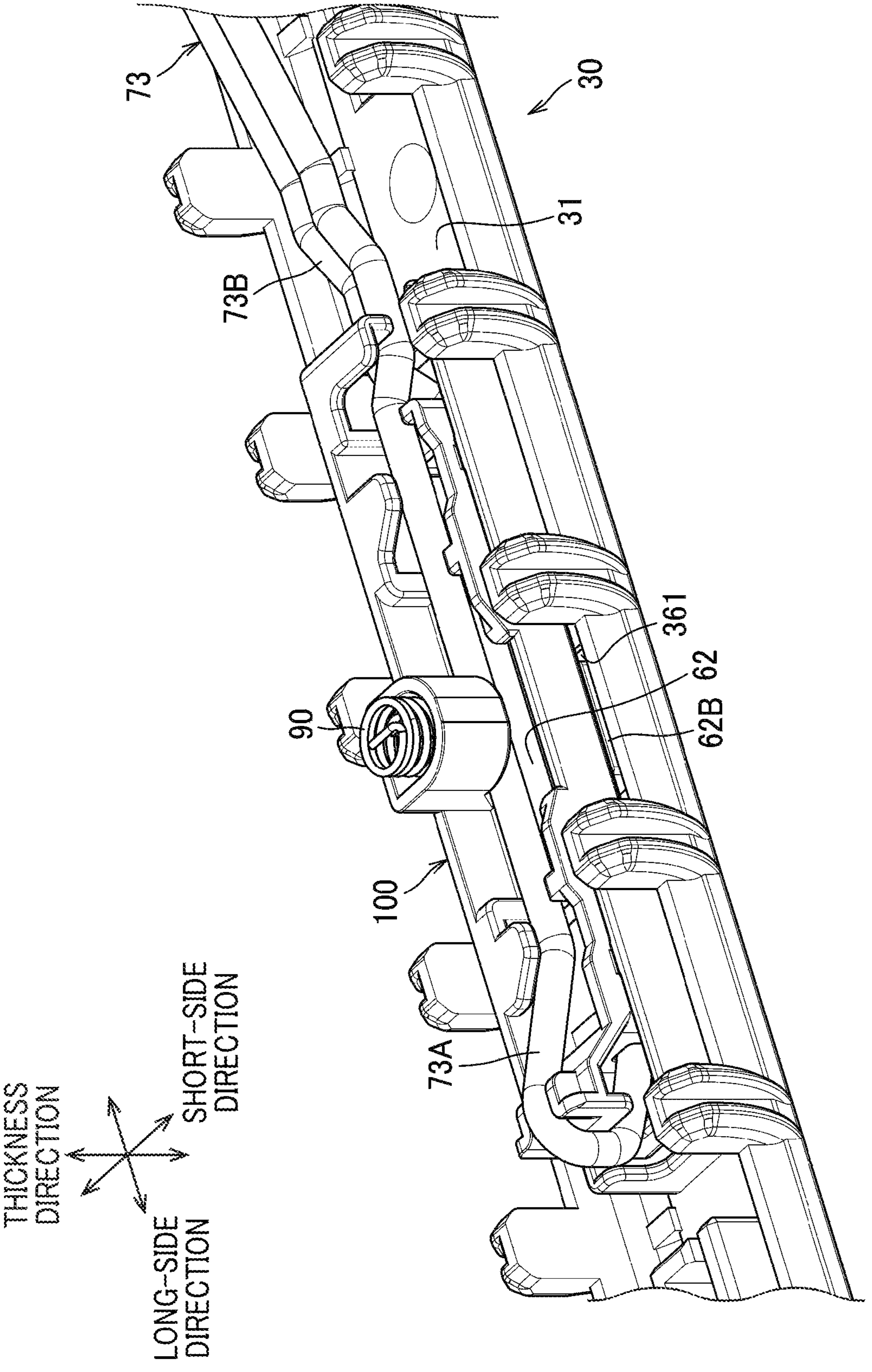
FIG. 9 is a partially-enlarged perspective view of the holder, a cover, and a thermostat in the heating unit.

As illustrated in FIG. 9, the holder 30 supports the cover 100. The cover 100 holds the thermostat 62. In other words, the holder 30 supports the thermostat 62 through the cover 100.

Figure 10:
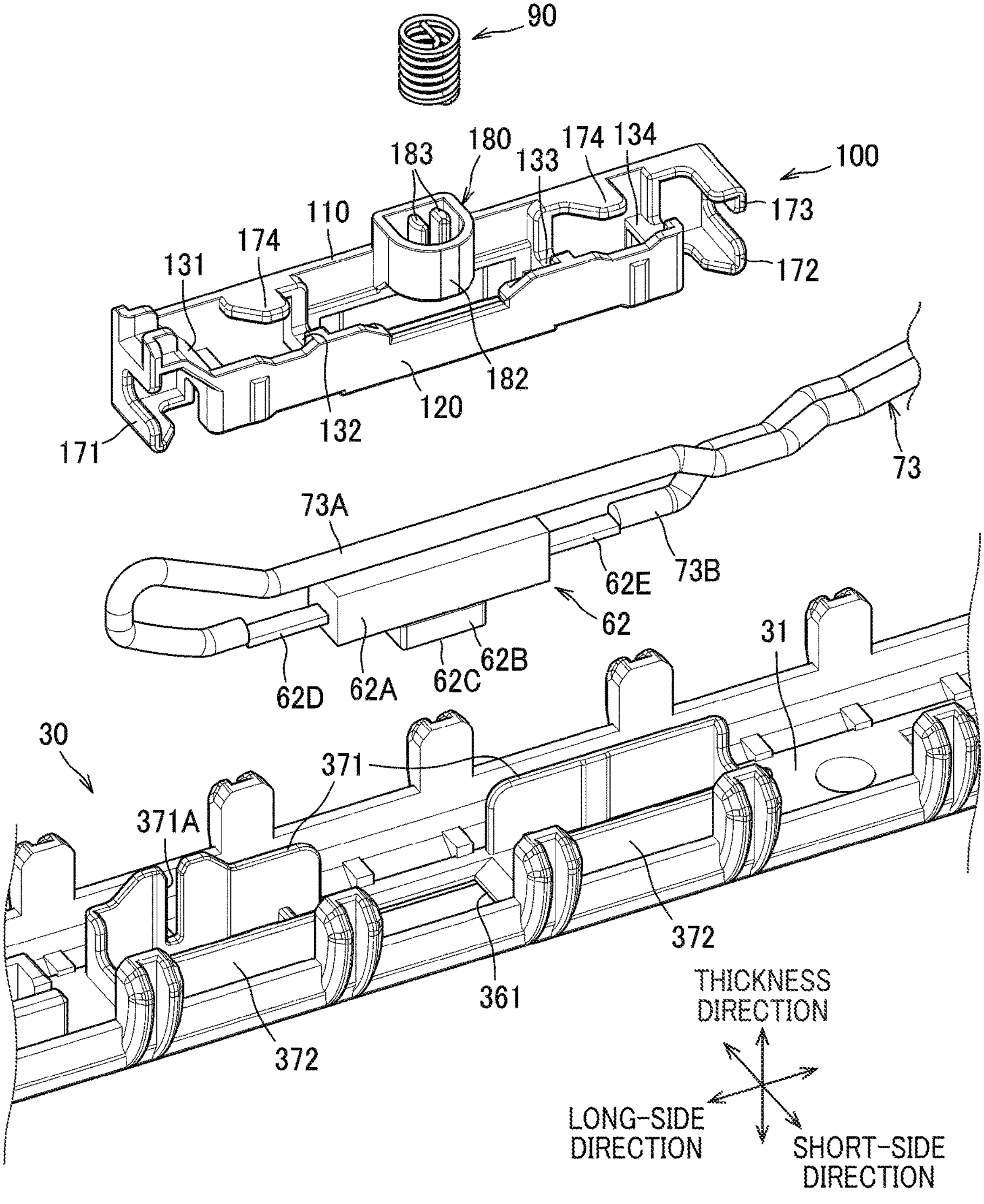
FIG. 10 is an exploded perspective view of the holder, the thermostat, the cover, and a compression coil spring in the heating unit.

As illustrated in FIG. 10, the cover 100 includes a first cover wall 110, a second cover wall 120, and connection walls 131, 132, 133, and 134.

The first cover wall 110 and the second cover wall 120 face each other in the short-side direction. The connection walls 131-134 respectively extend in the short-side direction to connect the first cover wall 110 to the second cover wall 120.

Figure 11:
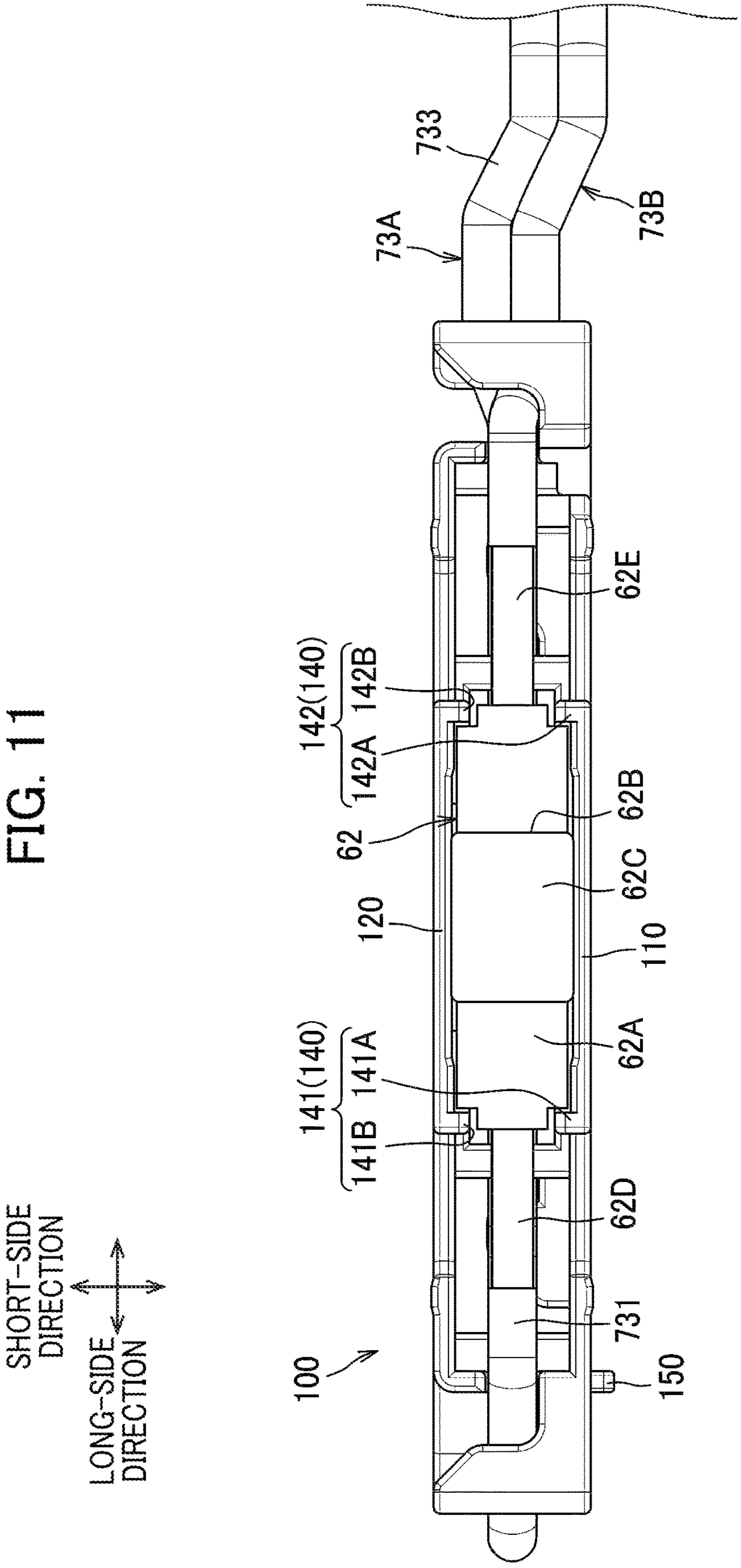
FIG. 11 is a view illustrating the cover and the thermostat as viewed from a heat-sensitive surface side of the thermostat in the thickness direction.

As illustrated in FIG. 11, the thermostat 62 is arranged between the first cover wall 110 and the second cover wall 120 as viewed in the thickness direction from the heat-sensitive surface 62C of the thermostat 62. The first cover wall 110 and the second cover wall 120 face the thermostat 62 in the short-side direction.

The cover 100 further includes an element positioning part 140. The element positioning part 140 functions to fix the thermostat 62 in position with respect to the long-side direction. The element positioning part 140 includes a first fitting part 141 and a second fitting part 142. The first fitting part 141 and the second fitting part 142 face each other and are spaced apart from each other in the long-side direction.

The first fitting part 141 includes a first protruding part 141A and a second protruding part 141B. The second fitting part 142 includes a third protruding part 142A and a fourth protruding part 142B.

The first protruding part 141A and the third protruding part 142A both protrude from the first cover wall 110 toward the second cover wall 120. The third protruding part 142A is spaced apart from the first protruding part 141A to face the same in the long-side direction.

The second protruding part 141B and the fourth protruding part 142B both protrude from the second cover wall 120 toward the first cover wall 110. Specifically, the second protruding part 141B protrudes from the second cover wall 120 toward the first protruding part 141A, and the fourth protruding part 142B protrudes from the second cover wall 120 toward the third protruding part 142A. The fourth protruding part 142B is spaced apart from the second protruding part 141B to face the same in the long-side direction.

The thermostat 62 is fitted between the first fitting part 141 and the second fitting part 142. Specifically, the thermostat 62 is fitted between the first protruding part 141A and the third protruding part 142A, and between the second protruding part 141B and the fourth protruding part 142B. As such, the thermostat 62 is fixed in position relative to the cover 100 in the long-side direction.

Further, the thermostat 62 is fitted between the first cover wall 110 and the second cover wall 120. As such, the thermostat 62 is fixed in position relative to the cover 100 in the short-side direction.

Figure 13:
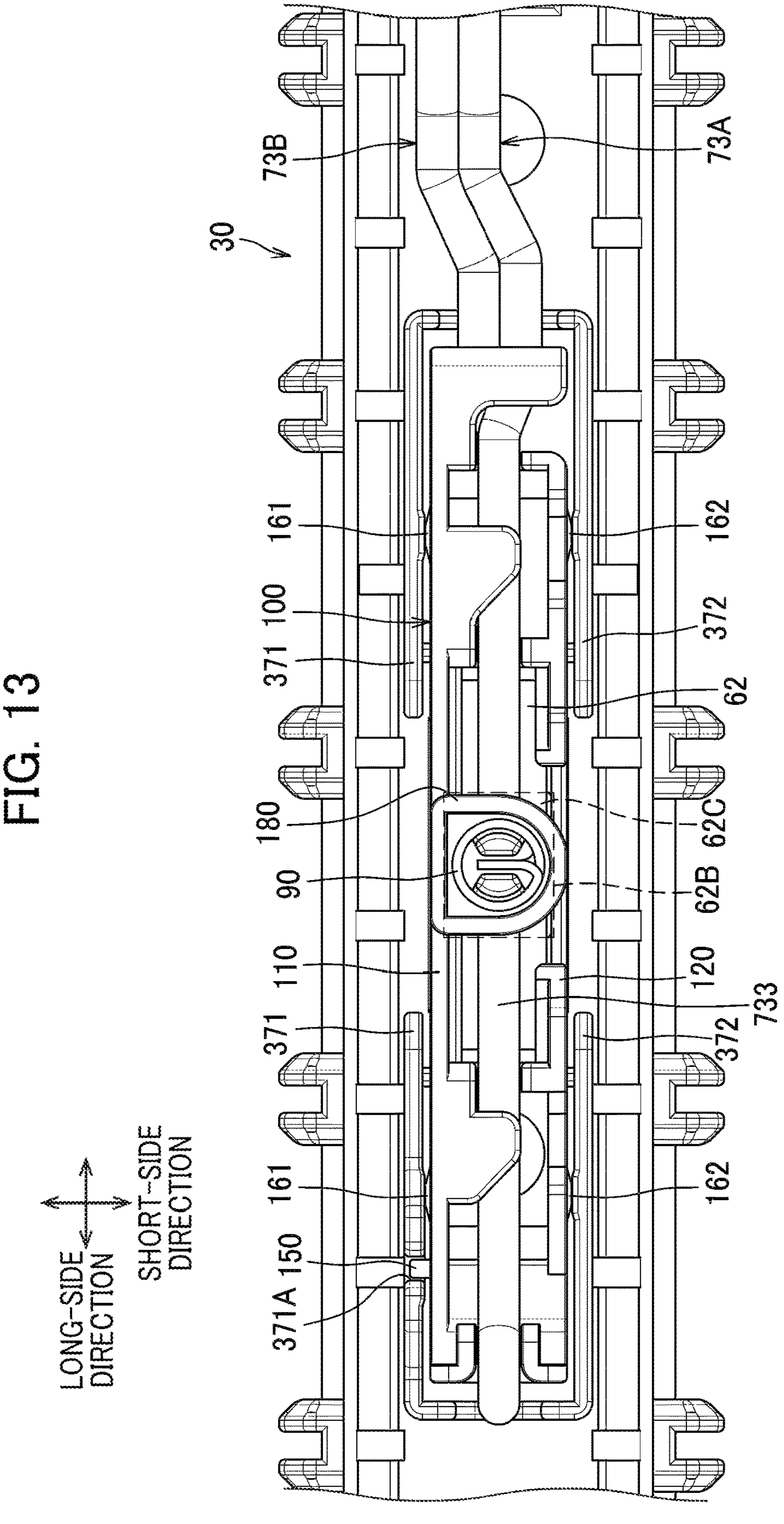
FIG. 13 is a view illustrating the holder, the cover, the thermostat, and the compression coil spring as viewed in the thickness direction of the base plate of the heater.

As illustrated in FIGS. 10 and 13, the holder 30 has a second through-hole 361, a first wall 371, and a second wall 372.

The second through-hole 361 penetrates throughout the support wall 31 in the thickness direction. The heat-sensitive portion 62B of the thermostat 62 is positioned in the second through-hole 361.

Figure 12:
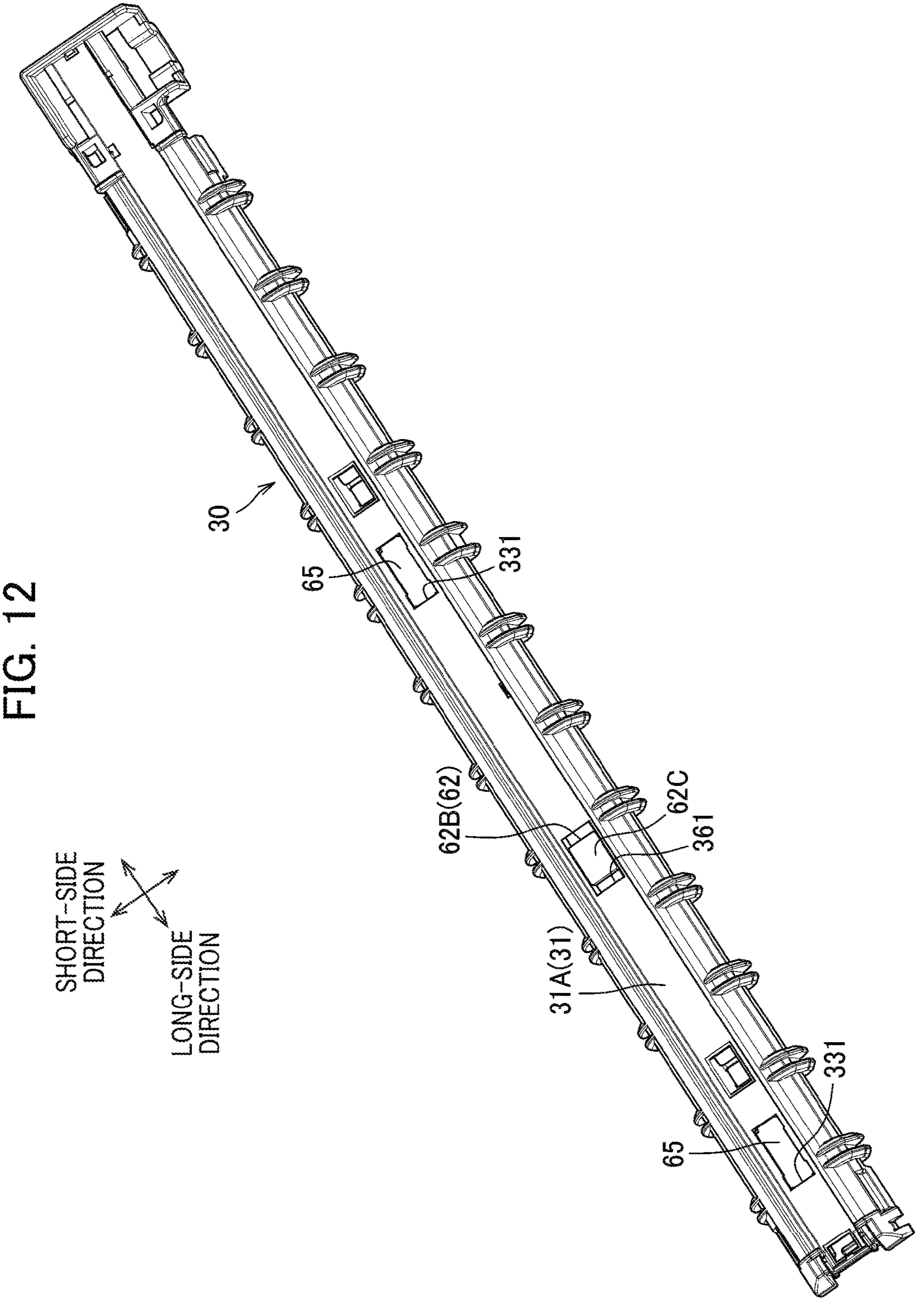
FIG. 12 is a perspective view of the holder and the thermostat as viewed from a heater side thereof.

As illustrated in FIG. 12, the second through-hole 361 has a size in the long-side direction that is greater than that of the heat-sensitive portion 62B. In a state where the thermostat 62 is fixed in position in the long-side direction relative to the cover 100 and the cover 100 is fixed in position in the long-side direction relative to the holder 30, the heat-sensitive portion 62B and the second through-hole 361 define a gap therebetween on each side in the long-side direction.

As illustrated in FIG. 13, the first wall 371 and the second wall 372 face each other in the short-side direction. The first wall 371 and the second wall 372 extend in the long-side direction. The cover 100 is interposed between the first wall 371 and the second wall 372 in the short-side direction.

Each of the first wall 371 and the second wall 372 faces the cover 100 in the short-side direction. Specifically, the first wall 371 faces the first cover wall 110 of the cover 100 in the short-side direction, and the second wall 372 faces the second cover wall 120 of the cover 100 in the short-side direction.

The first wall 371 functions to fix the position of the cover 100 in the long-side direction. Specifically, the first wall 371 has a recessed portion 371A. On the other hand, the cover 100 has a protruding portion 150. The protruding portion 150 protrudes from the first cover wall 110 outward toward the first wall 371.

The protruding portion 150 of the cover 100 is fitted with the recessed portion 371A of the first wall 371 in a state where the cover 100 is interposed between the first wall 371 and the second wall 372. This fitting engagement between the protruding portion 150 and the recessed portion 371A fixes the position of the cover 100 in the long-side direction relative to the holder 30, thereby fixing the position in the long-side direction of the thermostat 62 relative to the holder 30.

Figure 14:
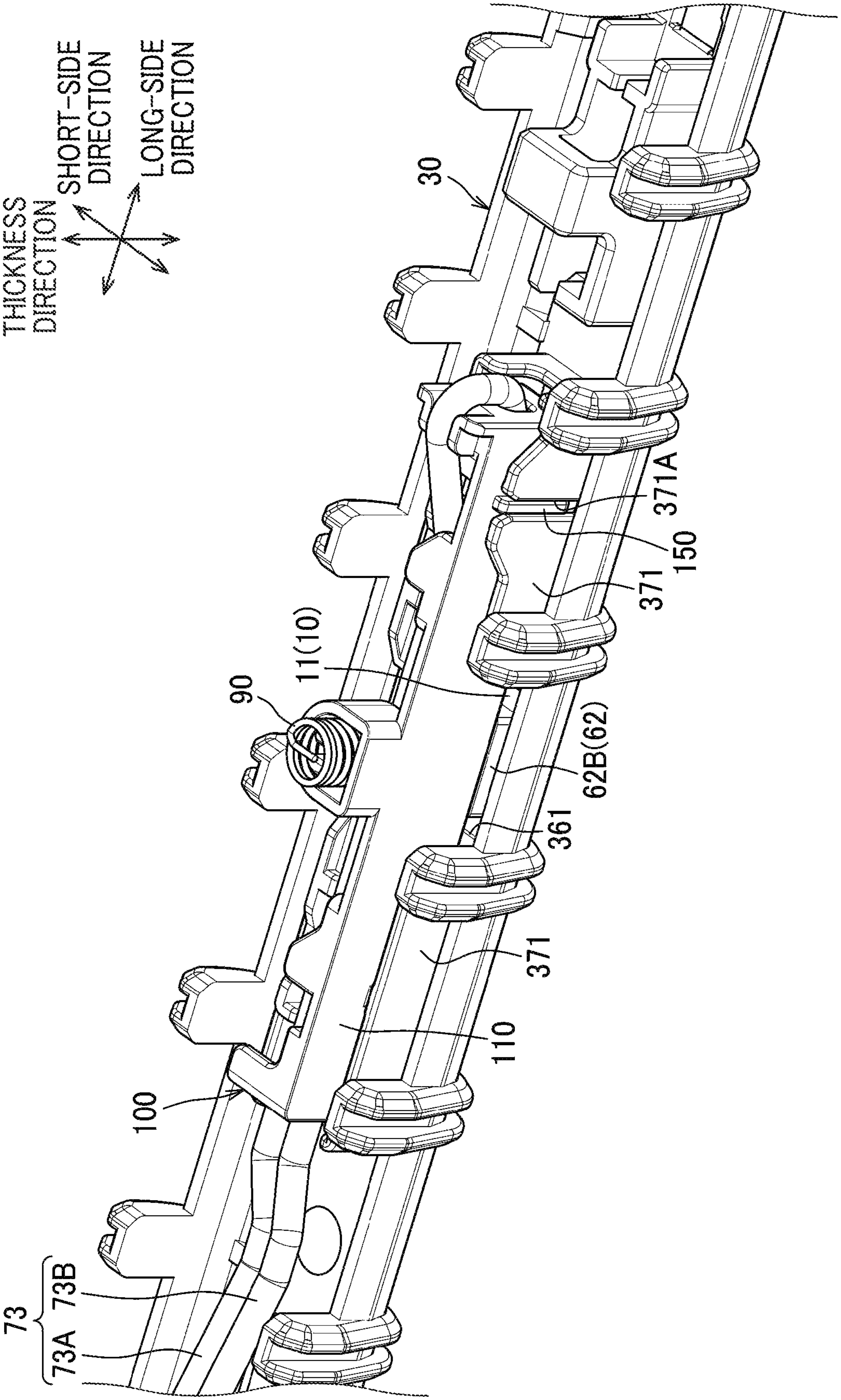
FIG. 14 is a partially-enlarged perspective view illustrating a grooved portion formed in a first wall portion of the holder, and a protrusion provided on the cover.

As illustrated in FIG. 14, the protruding portion 150 of the cover 100 has a rib-like shape extending in the thickness direction, and the recessed portion 371A of the first wall 371 has a groove-like configuration extending in the thickness direction.

As illustrated in FIG. 13, the cover 100 further includes a pair of first protrusions 161 and a pair of second protrusions 162. Each first protrusion 161 protrudes from the first cover wall 110 outward toward the first wall 371 of the holder 30. The two first protrusions 161 are positioned apart from each other in the long-side direction. Each second protrusion 162 protrudes from the second cover wall 120 outward toward the second wall 372 of the holder 30. The two second protrusions 162 are positioned apart from each other in the long-side direction.

The first protrusions 161 are in contact with the first wall 371 and the second protrusions 162 are in contact with the second wall 372 in the state where the cover 100 is interposed between the first wall 371 and the second wall 372 of the holder 30. The contacts between the protrusions 161, 162 and the corresponding walls 371, 372 fix the position of the cover 100 in the short-side direction relative to the holder 30, thereby fixing the position of the thermostat 62 in the short-side direction relative to the holder 30.

Figure 15:
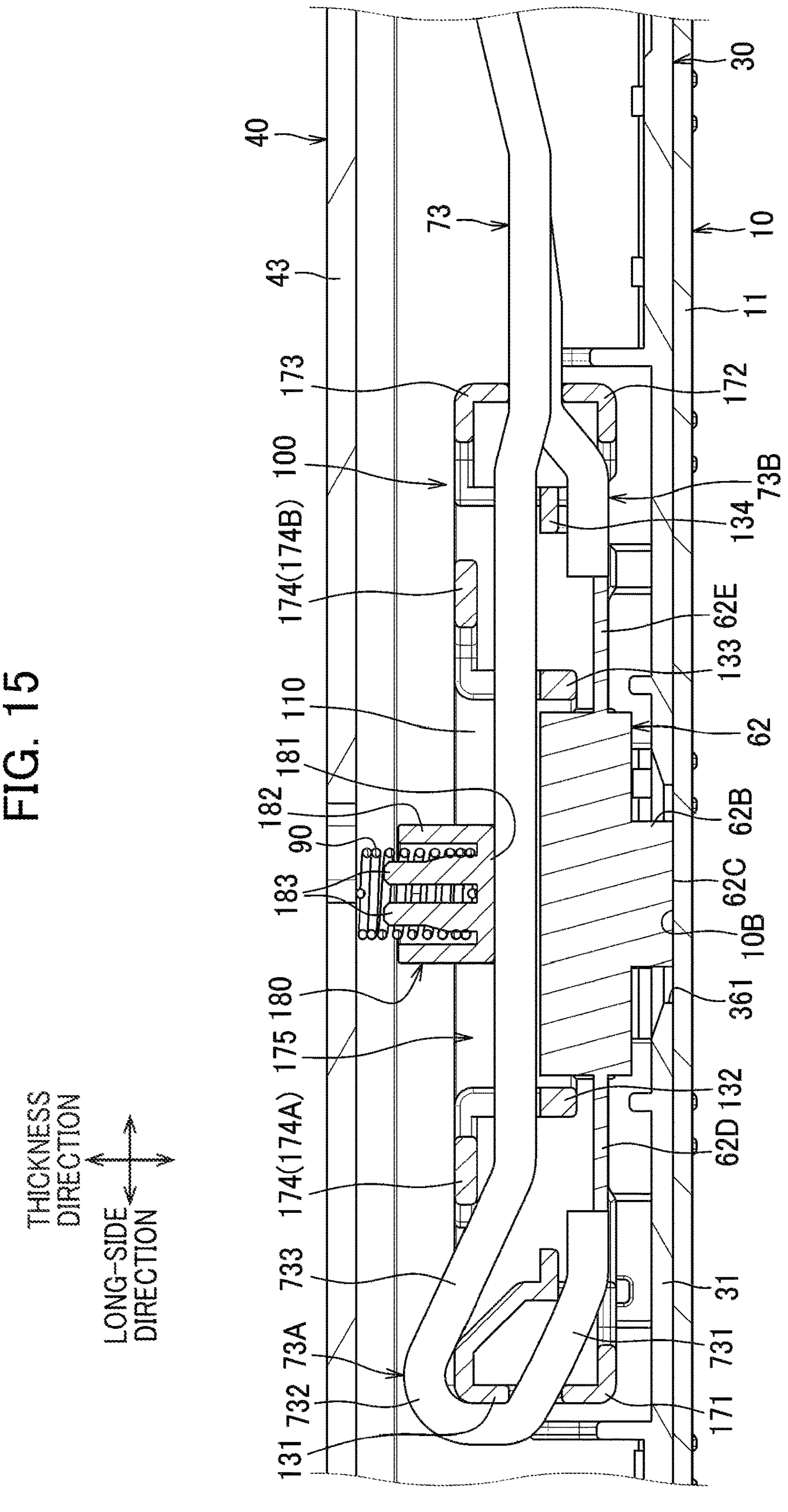
FIG. 15 is a cross-sectional view illustrating the heater, the holder, a stay, the cover, the thermostat, and the compression coil spring in the heating unit.

As illustrated in FIG. 15, the thermostat 62 faces the second surface 10B of the heater 10 in the thickness direction. Specifically, the heat-sensitive portion 62B of the thermostat 62 faces the second surface 10B of the heater 10 in the thickness direction. More specifically, the heat-sensitive surface 62C of the thermostat 62 faces the second surface 10B of the heater 10 in the thickness direction. In the present embodiment, the heat sensitive surface 62C is in contact with the second surface 10B of the heater 10.

The first cable 73A is connected to the first terminal 62D of the thermostat 62, and the second cable 73B is connected to the second terminal 62E of the thermostat 62. The first cable 73A extends from the first terminal 62D toward the one side in the long-side direction (leftward in FIG. 15), is then bent into a U-shape while being hooked over the connection wall 131 positioned at an end of the cover 100 at the one side in the long-side direction, and extends toward the other side in the long-side direction (rightward in FIG. 15). The second cable 73B extends from the second terminal 62E toward the other side in the long-side direction.

Specifically, the first cable 73A includes a first part 731, a second part 732, and a third part 733. The first part 731 is a portion extending from the first terminal 62D toward the one side in the long-side direction. The second part 732 is a bent portion extending from an end of the first part 731 toward the other side in the long-side direction. The third part 733 is a portion extending from an end of the second part 732 toward the other side in the long-side direction.

The cover 100 further includes a first restricting part 171, a second restricting part 172, a third restricting part 173, and a pair of fourth restricting parts 174 (see FIG. 10).

The first restricting part 171 is a portion which the first cable 73A can make contact with. The first restricting part 171 protrudes in the short-side direction from one end portion of the first cover wall 110 at the one side in the long-side direction. Specifically, the first restricting part 171 protrudes in the short-side direction from an end portion of the first cover wall 110, the end portion being at the one side in the long-side direction and at a side closer to the heater 10 in the thickness direction (i.e., the lower-left end of the first cover wall 110 in FIG. 10).

As illustrated in FIG. 15, the first restricting part 171 is positioned between the first part 731 of the first cable 73A and the heater 10 in the thickness direction. Specifically, the first restricting part 171 is positioned between the first part 731 and the support wall 31 in the thickness direction. In the present embodiment, the first part 731 of the first cable 73A is in contact with the first restricting part 171.

The connection wall 131 protrudes in the short-side direction from the one end portion of the first cover wall 110 in the long-side direction. The connection wall 131 is spaced apart from the first restricting part 171 in the thickness direction. The connection wall 131 is positioned farther away from the heater 10 than the first restricting part 171 is from the heater 10 in the thickness direction.

The second restricting part 172 is a portion which the second cable 73B can make contact with. The second restricting part 172 protrudes in the short-side direction from another end portion of the first cover wall 110 in the long-side direction. Specifically, the second restricting part 172 protrudes in the short-side direction from an end portion of the first cover wall 110, the end portion being at the other side in the long-side direction and at the side closer to the heater 10 in the thickness direction.

The second restricting part 172 is positioned between the second cable 73B and the heater 10 in the thickness direction. Specifically, the second restricting part 172 is positioned between the second cable 73B and the support wall 31 in the thickness direction. In the present embodiment, at least the second cable 73B is in contact with the second restricting part 172.

The third restricting part 173 protrudes in the short-side direction from the other end portion of the first cover wall 110 in the long-side direction. Specifically, the third restricting part 173 protrudes in the short-side direction from an end portion of the first cover wall 110, the end portion being at the other side in the long-side direction and at a side farther away from the heater 10 in the thickness direction (i.e., the upper-right end of the first cover wall 110 in FIG. 15). The third restricting part 173 faces the second restricting part 172 in the thickness direction to provide a space therebetween.

The second cable 73B extends through the space between the second restricting part 172 and the third restricting part 173 in the thickness direction and extends to an outside of the cover 100. The third part 733 of the first cable 73A is positioned opposite the heater 10 with respect to the second restricting part 172 in the thickness direction. Specifically, the third part 733 extends through the space between the second restricting part 172 and the third restricting part 173 in the thickness direction.

Each of the two fourth restricting part 174 protrudes in the short-side direction from an end of the first cover wall 110 positioned farther away from the first cover wall 110 in the thickness direction. As illustrated in FIG. 15, one of the two fourth restricting parts 174 (labeled as 174A) is positioned opposite the heater 10 with respect to the first terminal 62D in the thickness direction. The remaining one of the two fourth restricting parts 174 (labeled as 174B) is positioned opposite the heater 10 with respect to the second terminal 62E in the thickness direction.

The cover 100 provides a cable passage 175 through which the third part 733 of the first cable 73A extends. The cable passage 175 is positioned between the thermostat 62 and the compression coil spring 90 in the thickness direction. The cable passage 175 is positioned between the connection walls 131-134 and the fourth restricting parts 174A, 174B in the thickness direction. The third part 733 of the first cable 73A extends through the cable passage 175, and then extends to the outside of the cover 100 through a space between the second restricting part 172 and the third restricting part 173.

The compression coil spring 90 urges the thermostat 62 toward the heater 10 through the cover 100. Specifically, the cover 100 further includes a spring mount part 180 where the compression coil spring 90 is mounted (also see FIG. 10). The spring mount part 180 is integral with the first cover wall 110 and is positioned at a center portion of the cover 100 in the long-side direction. The spring mount part 180 is positioned between the fourth restricting parts 174A and 174B in the long-side direction.

As illustrated in FIG. 15, the spring mount part 180 includes a spring support wall 181, a side wall 182, and engaging protrusions 183.

The spring support wall 181 protrudes in the short-side direction toward the second cover wall 120 from an end portion of the first cover wall 110 in the thickness direction at the side farther away from the heater 10 in the thickness direction. The side wall 182 has a tubular shape. The side wall 182 protrudes in the thickness direction from an outer periphery of the spring support wall 181 to extend away from the heater 10. The engaging protrusions 183 protrude in the thickness direction from a center portion of the spring support wall 181 in the long-side direction to extend away from the heater 10.

The compression coil spring 90 is arranged inside the side wall 182 such that one end of the compression coil spring 90 closer to the heater 10 in the thickness direction is engaged with the engaging protrusions 183. The compression coil spring 90 is positioned between the stay 40 and the thermostat 62 in the thickness direction. Specifically, the compression coil spring 90 is positioned between the third stay wall 43 of the stay 40 and the spring support wall 181 of the spring mount part 180.

The compression coil spring 90 has one end in contact with the cover 100, and another end in contact with the stay 40. Specifically, the one end of the compression coil spring 90 is in contact with the spring support wall 181 of the spring mount part 180, and the other end of the compression coil spring 90 is in contact with the third stay wall 43 of the stay 40.

As illustrated in FIG. 13, the compression coil spring 90 is overlapped with the heat-sensitive portion 62B of the thermostat 62 as viewed in the thickness direction. More specifically, the compression coil spring 90 is overlapped with the heat-sensitive surface 62C of the thermostat 62 as viewed in the thickness direction. In the present embodiment, the compression coil spring 90 urges the thermostat 62 in a direction parallel to the thickness direction of the base plate 11.

As illustrated in FIG. 14, the protruding portion 150 of the cover 100 is in a form of a rib extending in the thickness direction. The recessed portion 371A of the holder 30 is in a form of a groove extending in the thickness direction. With this configuration, the cover 100 is movable in the thickness direction relative to the holder 30. Hence, the thermostat 62 supported by the cover 100 is also movable in the thickness direction relative to the holder 30. In other words, the cover 100 and the thermostat 62 are movable, relative to the holder 30, in a direction parallel to the urging direction of the compression coil spring 90 (thickness direction).

Figure 16:
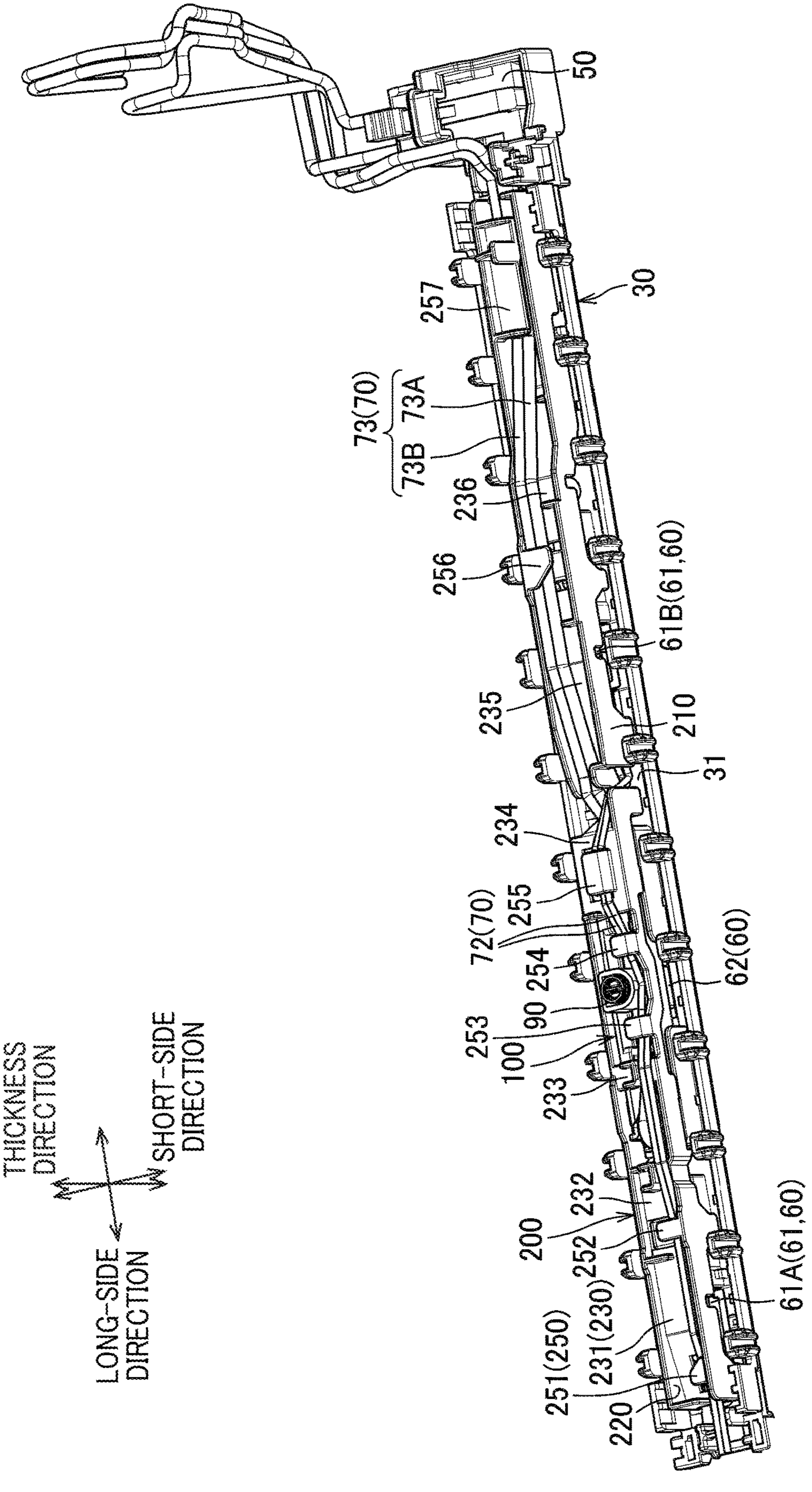
FIG. 16 is a perspective view illustrating the holder, a cable guide, a center thermistor cable, and a thermostat cable in the heating unit.
Figures 17A, 17B:
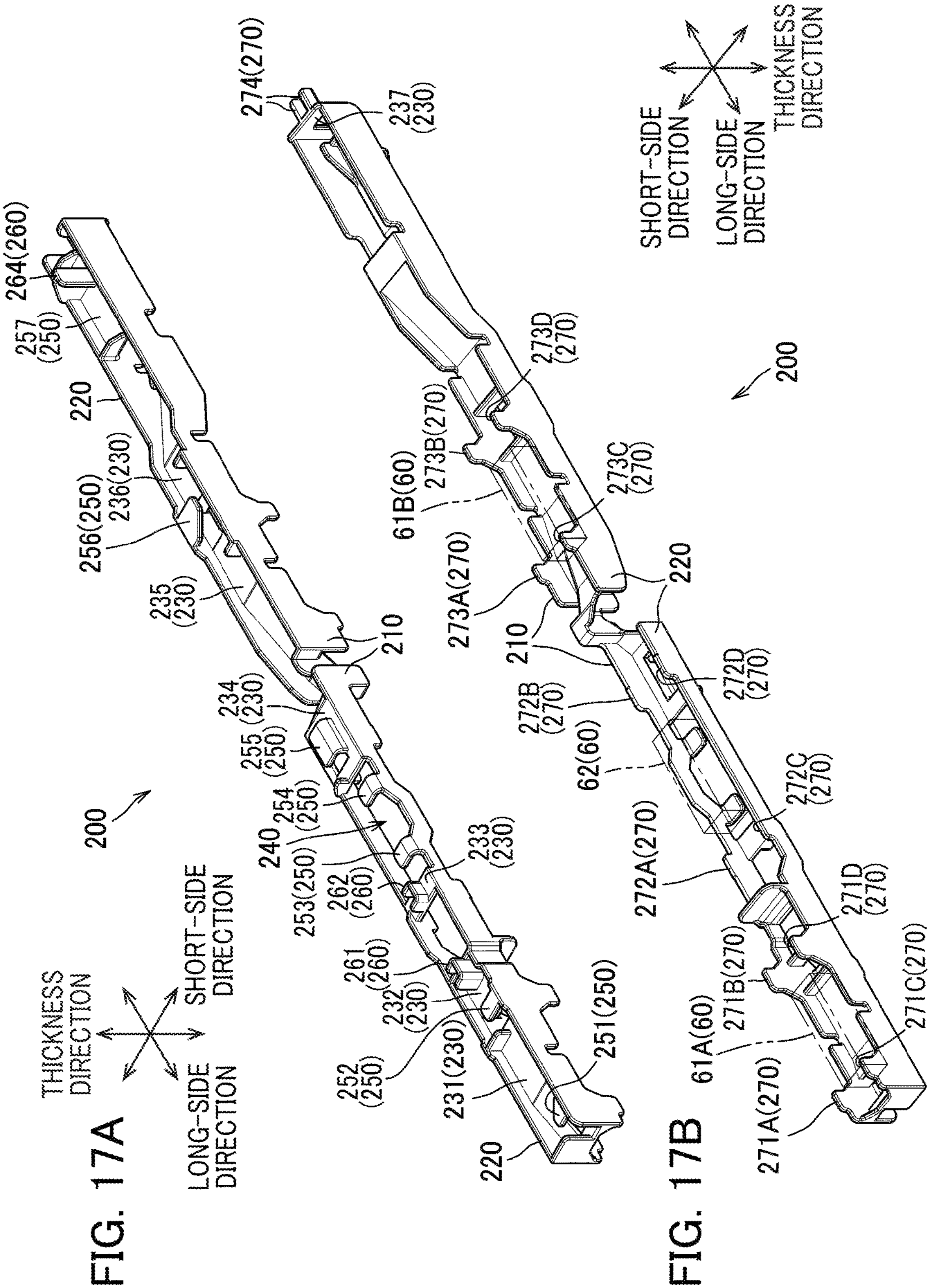
FIG. 17A is a perspective view of the cable guide.
FIG. 17B is another perspective view of the cable guide.

As illustrated in FIG. 16, the cable guide 200 is positioned on the holder 30. The cable guide 200 holds the center thermistor cable 72 and the thermostat cables 73. As illustrated in FIG. 17A, the cable guide 200 includes a first side wall 210, a second side wall 220, and a partitioning wall 230.

The first side wall 210 and the second side wall 220 43 respectively extend in the long-side direction to face each other in the short-side direction. The first side wall 210 is at one side in the short-side direction (lower-right side in FIG. 17A) and the second side wall 220 is at another side in the short-side direction (upper-left side in FIG. 17B). That is, the first side wall 210 constitutes one end of the cable guide 200 in the short-side direction, and the second side wall 220 constitutes another end of the cable guide 200 in the short-side direction. The partitioning wall 230 is positioned between the first side wall 210 and the second side wall 220 to connect the first side wall 210 to the second side wall 220 in the short-side direction.

The partitioning wall 230 includes a first partitioning wall 231, a second partitioning wall 232, a third partitioning wall 233, a fourth partitioning wall 234, a fifth partitioning wall 235, a sixth partitioning wall 236, and a seventh partitioning wall 237 (see FIG. 17B). The first partitioning wall 231, the second partitioning wall 232, the third partitioning wall 233, the fourth partitioning wall 234, the fifth partitioning wall 235, the sixth partitioning wall 236, and the seventh partitioning wall 237 are arrayed in this order given from the one side toward the other side in the long-side direction (from the left to the right in FIG. 17A).

Figure 18A:
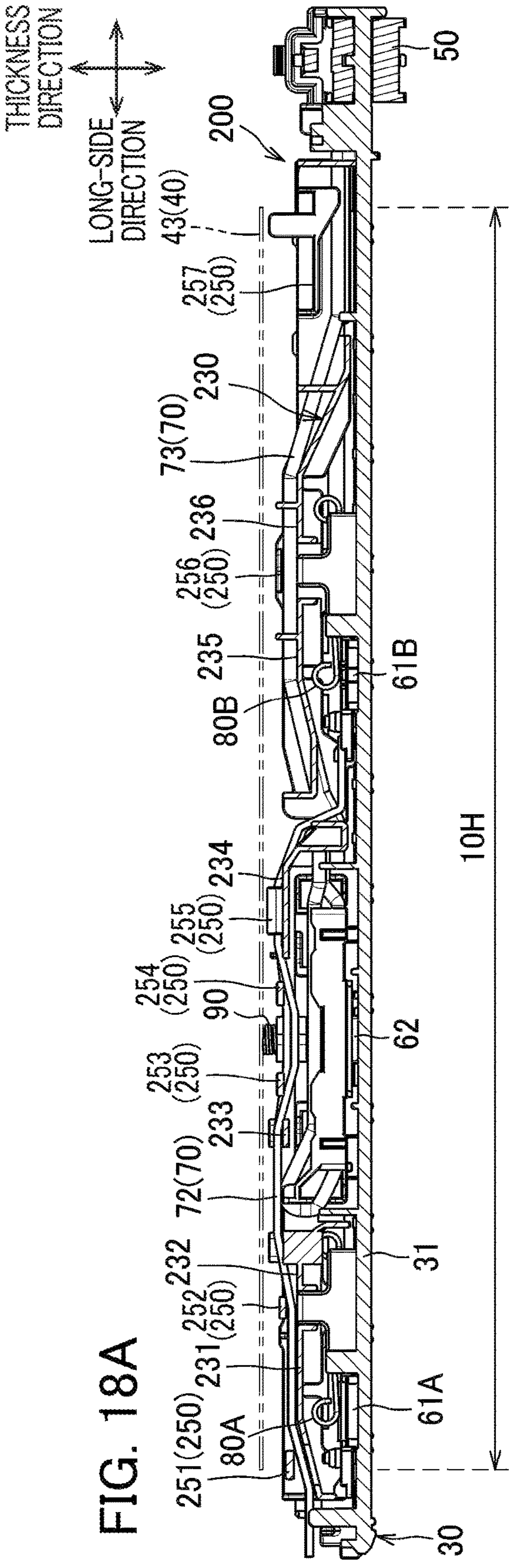
FIG. 18A is a cross-sectional view of the holder and the cable guide taken along a plane extending in the thickness direction near the center thermistor cable.
Figure 18B:
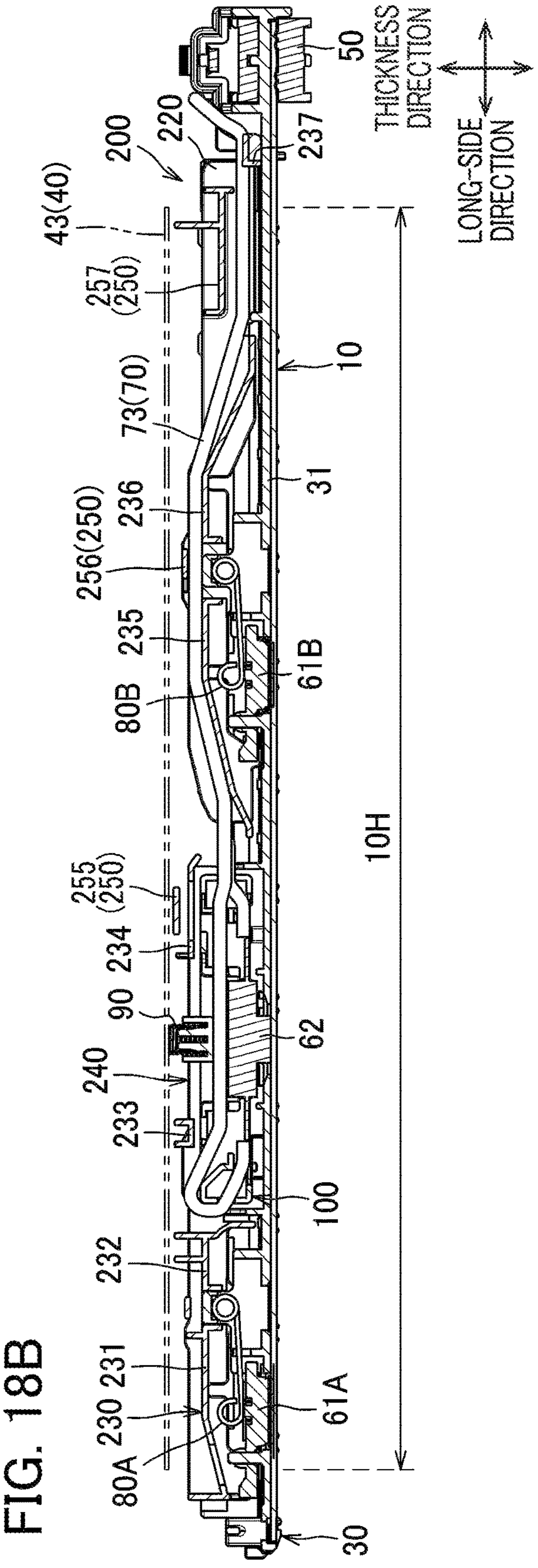
FIG. 18B is a cross-sectional view of the holder and the cable guide taken along a plane extending in the thickness direction near the thermostat cable.

As illustrated in FIGS. 18A and 18B, the partitioning wall 230 is positioned between at least a part of the cable 70 and the support wall 31 of the holder 30 in the thickness direction. Specifically, the first partitioning wall 231, the second partitioning wall 232, the third partitioning wall 233, and the fourth partitioning wall 234 are positioned between the center thermistor cable 72 and the support wall 31 in the thickness direction. The fifth partitioning wall 235, the sixth partitioning wall 236, and the seventh partitioning wall 237 are positioned between the thermostat cables 73 and the support wall 31 in the thickness direction.

The partition wall 230 is arranged to extend in the long-side direction at least in such a range corresponding to a heat-generating region 10H where the resistance heating elements 12 of the heater 10 (see FIG. 2) are provided in the long-side direction.

Specifically, a major portion of the first partitioning wall 231 (except one end portion thereof in the long-side direction) is positioned within the heat-generating region 10H in the long-side direction. Further, the second partitioning wall 232, the third partitioning wall 233, the fourth partitioning wall 234, the fifth partitioning wall 235, and the sixth partitioning wall 236 in their entirety are positioned within the heat-generating region 10H in the long-side direction.

The one end portion in the long-side direction of the first partitioning wall 231 is positioned outside the heat-generating region 10H at the one side in the long-side direction. The seventh partitioning wall 237 is positioned outside the heat-generating region 10H at the other side in the long-side direction. The seventh partitioning wall 237 extends in the short-side direction to connect an end of the first side wall 210 to an end of the second side wall 220, the end of the first side wall 210 being at the other side in the long-side direction and at the side closer to the heater 10 in the thickness direction and the end of the second side wall 220 being at the other side in the long-side direction and at the side closer to the heater 10 in the thickness direction (lower-right ends of the first side wall 210 and second side wall 220 in FIG. 17A).

The cable guide 200 supports the center thermistor cable 72 and the thermostat cables 73 such that the center thermistor cable 72 and the thermostat cables 73 are separated from the support wall 31 at least within the heat-generating region 10H in the long-side direction. Further, each end portion of the cable guide 200 is positioned outside the heat-generating region 10H in the long-side direction and supports the center thermistor cable 72 and the thermostat cables 73 to keep the center thermistor cable 72 and the thermostat cables 73 spaced apart from the support wall 31.

Specifically, in the cable guide 200, the center thermistor cable 72 is supported by the first partitioning wall 231, the second partitioning wall 232, the third partitioning wall 233, and the fourth partitioning wall 234 within the heat-generating region 10H in the long-side direction. In this way, the cable guide 200 holds the center thermistor cable 72 in separation from the support wall 31 in the thickness direction. Further, in the cable guide 200, the fifth partitioning wall 235 and the sixth partitioning wall 236 support the thermostat cables 73 within the heat-generating region 10H in the long-side direction. The cable guide 200 thus holds the thermostat cables 73 in separation from the support wall 31 in the thickness direction.

Further, in the cable guide 200, the one end portion in the long-side direction of the first partitioning wall 231 supports the center thermistor cable 72 outside the heat-generating region 10H at the one side in the long-side direction, thereby retaining the center thermistor cable 72 away from the support wall 31. Still further, in the cable guide 200, the seventh partitioning wall 237 supports the thermostat cables 73 outside the heat-generating region 10H at the other side in the long-side direction, thereby retaining the thermostat cables 73 away from the support wall 31.

As illustrated in FIG. 18A, the first partitioning wall 231 and the second partitioning wall 232 are positioned in the thickness direction between the center thermistor cable 72 and the torsion coil spring 80A urging the side thermistor 61A toward the heater 10. The first partitioning wall 231 and the second partitioning wall 232 support the center thermistor cable 72 such that the center thermistor cable 72 is held on an opposite side of the torsion coil spring 80A from the support wall 31 in the thickness direction.

Here, the center thermistor cable 72 is an example of a "second cable connected to the second temperature sensing element" and the torsion coil springs 80A is an example of a "first urging member". Further, the center thermistor 61B is an example of a "second temperature sensing element" and the side thermistor 61A is an example of a "first temperature sensing element".

As illustrated in FIG. 18B, the fifth partitioning wall 235 and the sixth partitioning wall 236 are positioned in the thickness direction between the thermostat cables 73 and the torsion coil spring 80B urging the center thermistor 61B toward the heater 10. The fifth partitioning wall 235 and the sixth partitioning wall 236 support the thermostat cables 73 such that the thermostat cables 73 are held on an opposite side of the torsion coil spring 80B from the support wall 31 in the thickness direction.

Here, the thermostat cables 73 are an example of the "second cable connected to the second temperature sensing element" and the torsion coil spring 80B is an example of the "first urging member. Further, the thermostat 62 is an example of the "second temperature sensing element" and the center thermistor 61B is an example of the "first temperature sensing element".

The cable guide 200 also has a through-hole 240 as an example of a through-hole of the disclosure. The through-hole 240 allows the compression coil spring 90 to extend therethrough in the thickness direction. In the present embodiment, the through-hole 240 is positioned between the third partitioning wall 233 and the fourth partitioning wall 234 in the long-side direction. The one end of the compression coil spring 90 is in contact with the cover 100, and the other end of the compression coil spring 90 is in contact with the stay 40 through the through-hole 240.

As illustrated in FIG. 17A, the cable guide 200 further includes a plurality of cable restricting parts 250, a plurality of stay abutment parts 260, and a plurality of holder abutment parts 270.

The cable restricting parts 250 function to restrict the center thermistor cable 72 and the thermostat cables 73 from moving toward the stay 40 in the thickness direction. As illustrated in FIGS. 18A and 18B, the cable restricting parts 250 are positioned between the cables 72, 73 and the stay 40 in the thickness direction.

Specifically, the cable restricting parts 250 include a first restricting piece 251, a second restricting piece 252, a third restricting piece 253, a fourth restricting piece 254, a fifth restricting piece 255, a sixth restricting piece 256, and a seventh restricting piece 257.

The first restricting piece 251, the second restricting piece 252, the third restricting piece 253, the fourth restricting piece 254, and the fifth restricting piece 255 are positioned between the center thermistor cable 72 and the third stay wall 43 of the stay 40, and are configured to restrict the center thermistor cable 72 from moving toward the third stay wall 43 in the thickness direction.

As illustrated in FIG. 17A, the first restricting piece 251, the second restricting piece 252, the third restricting piece 253, and the fourth restricting piece 254 respectively protrude from the first side wall 210 toward the second side wall 220 in the short-side direction. The first restricting piece 251 is provided at the one end portion of the cable guide 200 (one end portion of the first side wall 210) in the long-side direction. The second restricting piece 252 is positioned between the first partitioning wall 231 and the second partitioning wall 232 in the long-side direction.

The third restricting piece 253 and the fourth restricting piece 254 are positioned between the third partitioning wall 233 and the fourth partitioning wall 234 in the long-side direction. As illustrated in FIG. 18A, the compression coil spring 90 is positioned between the third restricting piece 253 and the fourth restricting piece 254 in the long-side direction. The fifth restricting piece 255 protrudes from the fourth partitioning wall 234 to extend away from the heater 10 in the thickness direction and is then bent toward the second side wall 220 in the short-side direction. The fifth restricting piece 255 thus has a generally L-shape when viewed in the long-side direction (see FIG. 17A).

As illustrated in FIG. 18B, the sixth restricting piece 256 and the seventh restricting piece 257 are positioned between the thermostat cables 73 and the third stay wall 43 of the stay 40 in the thickness direction, and are configured to restrict the thermostat cables 73 from moving toward the third stay wall 43. The sixth restricting piece 256 and the seventh restricting piece 257 protrude from the second side wall 220 toward the first side wall 210 in the short-side direction. The sixth restricting piece 256 is provided between the fifth partitioning wall 235 and the sixth partitioning wall 236 in the long-side direction. The seventh restricting piece 257 is provided at the other end portion of the cable guide 200 (another end portion of the second side wall 220) in the long-side direction and extends in the long-side direction.

As illustrated in FIG. 17A, the cable restricting parts 250 are arrayed in the long-side direction as viewed in the thickness direction. Specifically, the first restricting piece 251, the second restricting piece 252, the third restricting piece 253, and the fourth restricting piece 254 are arrayed in the long-side direction and positioned adjacent to the first side wall 210 in the short-side direction. The sixth restricting piece 256 and the seventh restricting piece 257 are arrayed in the long-side direction and positioned adjacent to the second side wall 220 in the short-side direction.

Figure 19A:
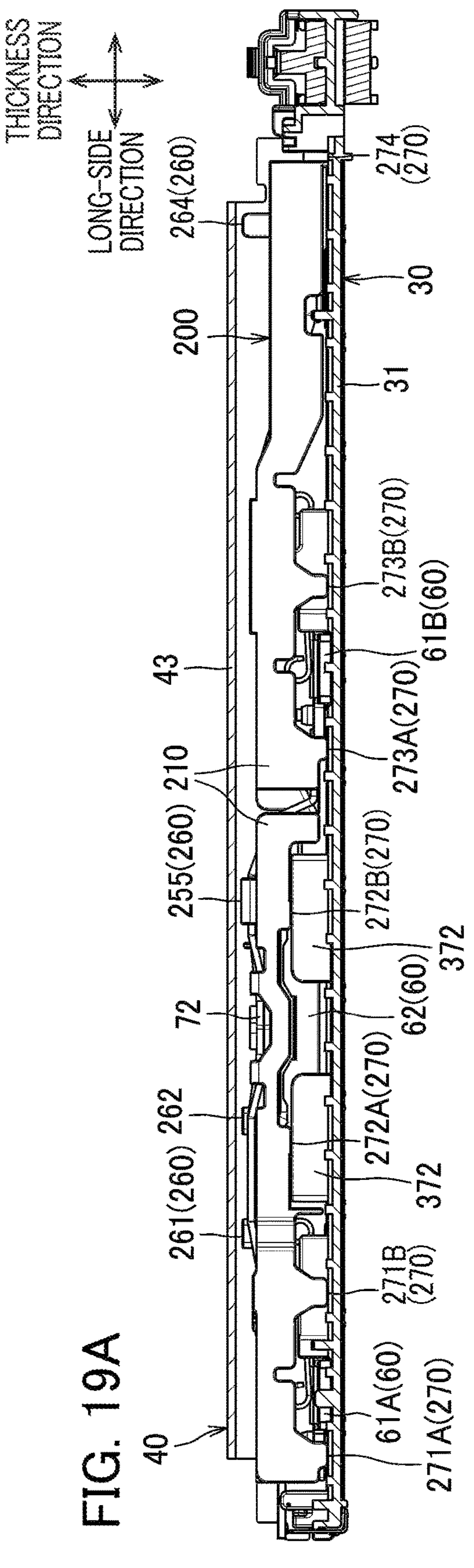
FIG. 19A is a view of the holder, the stay, and the cable guide as viewed from a side of a first side wall of the cable guide.
Figure 19B:
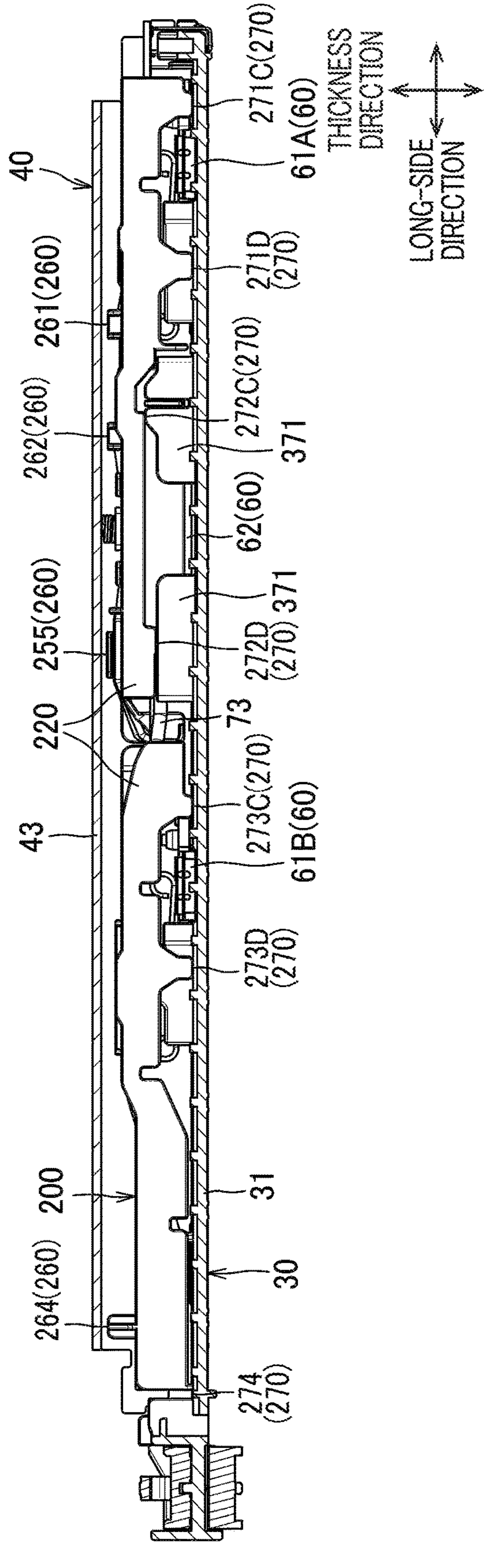
FIG. 19B is a view of the holder, the stay, and the cable guide as viewed from a side of a second side wall of the cable guide.

The stay abutment parts 260 are configured to abut on the third stay wall 43 of the stay 40 in the thickness direction. As illustrated in FIGS. 19A and 19B, each stay abutment part 260 protrudes toward the stay 40 in the thickness direction. Specifically, each stay abutment part 260 protrudes in the thickness direction toward the third stay wall 43. The stay abutment parts 260 include a first stay abutment part 261, a second stay abutment part 262, the fifth restricting piece 255 as a third stay abutment part, and a fourth stay abutment part 264.

As illustrated in FIG. 17A, the first stay abutment part 261 protrudes in the thickness direction from the second partitioning wall 232, and the second stay abutment part 262 protrudes in the thickness direction from the third partitioning wall 233. The fifth restricting piece 255 (the third stay abutment part) protrudes in the thickness direction from the fourth partitioning wall 234 as described above, and the fourth stay abutment part 264 protrudes in the thickness direction from the seventh restricting piece 257. The plurality of stay abutment parts 260 (261, 262, 255, and 264) are arrayed in the long-side direction as viewed in the thickness direction.

As illustrated in FIGS. 19A and 19B, the holder abutment parts 270 are in contact with the holder 30 in the thickness direction. The holder abutment parts 270 are provided at least around the temperature sensing element 60 (thermistors 61, thermostat 62) as viewed in the thickness direction.

Specifically, as illustrated in FIG. 17B, the holder abutment parts 270 include a first holder abutment part 271A, a second holder abutment 271B, a third holder abutment part 271C, a fourth holder abutment part 271D, a fifth holder abutment part 272A, a sixth holder abutment part 272B, a seventh holder abutment part 272C, an eighth holder abutment part 272D, a ninth holder abutment part 273A, a tenth holder abutment part 273B, an eleventh holder abutment part 273C, an twelfth holder abutment part 273D, and a thirteenth holder abutment part 274.

The first holder abutment part 271A and the second holder abutment part 271B protrude from the first side wall 210 toward the holder 30 in the thickness direction. The third holder abutment part 271C and the fourth holder abutment part 271D protrude from the second side wall 220 toward the holder 30 in the thickness direction.

As illustrated in FIG. 17B, the first through fourth holder abutment parts 271A-271D are positioned around the side thermistor 61A as viewed in the thickness direction. Specifically, each of the first through fourth holder abutment parts 271A-271D is positioned at one of four corners of a virtual rectangle surrounding the side thermistor 61A as viewed in the thickness direction.

The fifth holder abutment part 272A and the sixth holder abutment part 272B protrude slightly in the thickness direction from the first side wall 210 toward the holder 30. Similarly, the seventh holder abutment part 272C protrudes slightly in the thickness direction from the second side wall 220 toward the holder 30. The eighth holder abutment part 272D is a part of the second side wall 220, the part facing the holder 30 in the thickness direction.

As illustrated in FIG. 17B, the fifth through eighth holder abutment parts 272A-272D are positioned around the thermostat 62 as viewed in the thickness direction. Specifically, each of the fifth through eighth holder abutment parts 272A-272D is positioned at one of four corners of a virtual rectangle surrounding the thermostat 62 as viewed in the thickness direction.

The ninth holder abutment part 273A and the tenth holder abutment part 273B protrude from the first side wall 210 toward the holder 30 in the thickness direction. The eleventh holder abutment part 273C and the twelfth holder abutment part 273D protrude from the second side wall 220 toward the holder 30 in the thickness direction.

As illustrated in FIG. 17B, the ninth through twelfth holder abutment parts 273A-273D are positioned around the center thermistor 61B as viewed in the thickness direction. Specifically, each of the ninth through twelfth holder abutment parts 273A-273D is positioned at one of four corners of a virtual rectangle surrounding the center thermistor 61B as viewed in the thickness direction.

As illustrated in FIG. 17B, the thirteenth holder abutment part 274 protrudes outward from the seventh partitioning wall 237 in the long-side direction.

As illustrated in FIGS. 19A and 19B, the first through fourth holder abutment parts 271A-271D are in contact with the support wall 31 of the holder 30 in the thickness direction. The fifth holder abutment part 272A and the sixth holder abutment part 272B are in contact with the second wall 372 of the holder 30 in the thickness direction. The seventh holder abutment part 272C and the eighth holder abutment part 272D are in contact with the first wall 371 of the holder 30 in the thickness direction. The ninth through twelfth holder abutment parts 273A-273D are in contact with the support wall 31 of the holder 30 in the thickness direction. The thirteenth holder abutment part 274 has at a surface facing the support wall 31 of the holder 30 in the thickness direction, and the surface is in contact with the support wall 31 in the thickness direction.

Next, various technical advantages that can be obtained in the heating unit 1 according to the present embodiment will be described.

As illustrated in FIG. 4, the first arm part 82 of the torsion coil spring 80 urges the corresponding thermistor 61 toward the heater 10 in a state where the second arm part 83 of the torsion coil spring 80 is supported by the holder 30. As such, the thermistor 61 can be stably urged toward the heater 10 by the corresponding torsion coil spring 80.

The first arm part 82 is positioned on one side of the coil part 81 in the long-side direction, and the second arm part 83 is positioned on the other side of the coil part 81 in the long-side direction. The torsion coil spring 80 can be mounted to extend in the long-side direction.

The holder 30 includes the first positioning part 341 to fix the position of the first arm part 82 of the torsion coil spring 80 in the short-side direction, and the second positioning part 342 to fix the position of the second arm part 83 of the torsion coil spring 80 in the short-side direction. With this configuration, the torsion coil spring 80 to be fixed in position in the short-side direction.

The first positioning part 341 has the first groove 341A with which the first arm part 82 of the torsion coil spring 80 is fitted, and the second positioning part 342 has the second groove 342A with which the second arm part 83 of the torsion coil spring 80 is fitted. This simple configuration allows the torsion coil spring 80 to be fixed in position in the short-side direction.

As illustrated in FIG. 6, the holder 30 includes the spring retaining part 343 for suppressing positional displacement of the torsion coil spring 80 in the thickness direction. With this configuration, the thermistor 61 can be more stably urged toward the heater 10.

The spring restricting wall 343A of the spring retaining part 343 has the restricting recess 343D with which the coil part 81 of the torsion coil spring 80 is fitted for restricting displacement of the torsion coil spring 80 in the long-side direction. With this configuration, the thermistor 61 can be more stably urged toward the heater 10.

As illustrated in FIG. 7, the thermistor 61 and the torsion coil spring 80 are arranged linearly in the long-side direction. Hence, compact layout of the thermistor 61 and the corresponding torsion coil spring 80 in the short-side direction can be obtained.

The holder 30 includes the protrusion 332, and the thermistor 61 has the hole 611A through which the protrusion 332 extends to be engaged therewith upon attachment of the thermistor 61 to the holder 30. This engagement between the protrusion 332 and the hole 611A can restrict displacement of the thermistor 61 relative to the holder 30 in the long-side direction.

With the thermistor 61 engaged with the protrusion 332, the end portion 61E of the thermistor 61 (see FIG. 7) positioned away from the hole 611A in the long-side direction is interposed between the first retaining wall 344A and the second retaining wall 344B of the holder 30 in the short-side direction. With this structure, the position of the thermistor 61 relative to the holder 30 can be fixed in the long-side direction as well as in the short-side direction.

As illustrated in FIG. 8, the side thermistor cable 71 extends between the heater 10 and the cable restricting part 352. Accordingly, even if the side thermistor cable 71 is pulled in a direction away from the heater 10 for some reason, the pulled side thermistor cable 71 comes into contact with the cable restricting part 352. In this way, the cable restricting part 352 can restrict the side thermistor cable 71 from moving further in the direction away from the heater 10.

In the present embodiment, the side thermistor cable 71 connected to the thermistor 61A is bent into an L-shape to extend in the direction away from the heater 10 as illustrated in FIG. 8. As a result, the side thermistor cable 71 tends to be pulled in the direction away from the heater 10 during wiring on the holder 30. In this connection, since the cable restricting part 352 is arranged at a position corresponding to the bent part (the second part 71B) of the side thermistor cable 71 in the present embodiment, displacement of the thermistor 61 in the direction away from the heater 10 can be effectively restricted by the cable restricting part 352.

As illustrated in FIG. 11, the cover 100 retaining the thermostat 62 includes the element positioning part 140, and the holder 30 supporting the heater 10 and the cover 100 has the first wall 371 for fixing the position of the cover 100 in the long-side direction as illustrated in FIG. 13. This configuration can provide an enhance positioning accuracy of the thermostat 62 with respect to the holder 30 in the long-side direction, compared to a case where positioning of the thermostat 62 in the long-side directions is realized only through fitting of the heat-sensitive portion 62B of the thermostat 62 with the second through-hole 361 in the support wall 31. Hence, the configuration according to the embodiment (provision of the first wall 371 and the element positioning part 140) can improve accuracy in positioning of the thermostat 62 relative to the heater 10 supported by the holder 30 in the long-side direction.

As illustrated in FIG. 11, the thermostat 62 is fitted between the first fitting part 141 and the second fitting part 142 of the cover 100 in the long-side direction. With this simple configuration, the position of the thermostat 62 relative to the cover 100 can be fixed in the long-side direction.

Further, positioning of the thermostat 62 relative to the cover 100 in the short-side direction can be performed through a simple structure where the thermostat 62 is interposed between the first cover wall 110 and the second cover wall 120 to be fitted therebetween.

As illustrated in FIG. 13, the compression coil spring 90 is overlapped with the heat-sensitive surface 62C (heat-sensitive portion 62B) of the thermostat 62 as viewed in the thickness direction. With this structure, the thermostat 62 can be stably urged by the compression coil spring 90 toward the heater 10.

The cover 100 includes the first protrusions 161 in contact with the first wall 371, and the second protrusions 162 in contact with the second wall 372. With this structure, by fitting the cover 100 between the first wall 371 (provided with the first protrusions 161) and the second wall 372 (provided with the second protrusions 162) of the holder 30, the cover 100 can be fixed in position relative to the holder 30 in the short-side direction.

As illustrated in FIG. 14, the protruding portion 150 of the cover 100 is engaged with the recessed portion 371A of the first wall 371 of the holder 30. With this simple configuration, positioning of the cover 100 relative to the holder 30 can be performed in the long-side direction.

The protruding portion 150 is a rib extending in the thickness direction, and the recessed portion 371A is a groove extending in the thickness direction. Simple engagement of the protruding portion 150 with the recessed portion 371A can not only fix the position of the cover 100 relative to the holder 30 in the long-side direction, but also enables the cover 100 and the thermostat 62 to be movable in the thickness direction (the urging direction of the compression coil spring 90) relative to the holder 30.

As illustrated in FIG. 15, the cover 100 includes the first restricting part 171 and the second restricting part 172. With this structure, even in a case where the thermostat 62 is prompted to move toward the heater 10 relative to the cover 100, the first restricting part 171 and the second restricting part 172 can contact the thermostat cables 73 to restrict the thermostat cables 73 from being detached from the cover 100. Hence, the thermostat 62 is less likely to be disengaged from the cover 100.

The cover 100 includes the first restricting part 171 positioned between the heater 10 and the first part 731 of the first cable 73A to make contact with the first part 731. With this structure, the first restricting part 171 can receive a restoring force of the bending part (second part 732) of the first cable 73A, thereby suppressing displacement of the thermostat 62.

Further, the cover 100 includes the second restricting part 172 positioned between the heater 10 and the second cable 73B to make contact with the second cable 73B. With this structure, the contact between the second restricting part 172 and second cable 73B can restrict disengagement of the thermostat 62 from the cover 100.

The third part 733 of the first cable 73A extends to be positioned opposite the heater 10 with respect to the second restricting part 172. Hence, the second restricting part 172 can restrict displacement of the third part 733 toward the heater 10.

The compression coil spring 90 urges the thermostat 62 toward the heater 10 through the cover 100. That is, the compression coil spring 90 urges the thermostat 62 toward the heater 10 together with the cover 100 which suppresses positional displacement of the thermostat 62. In other words, the compression coil spring 90 urges the thermostat 62 toward the heater 10 together with the cover 100 which fixes the position of the thermostat 62 in the long-side direction. With this configuration, the thermostat 62 can be stably urged by the compression coil spring 90.

One end of the compression coil spring 90 is seated on the stay 40 having a high rigidity. Hence, the compression coil spring 90 is stably supported by the stay 40. As such, the compression coil spring 90 can urge the thermostat 62 stably.

The cover 100 has the cable passage 175 positioned between the thermostat 62 and the compression coil spring 90. With this structure, layout of the first cable 73A, which is arranged to extend through the cable passage 175, can be made compact, compared to a case where, for example, the first cable 73A is arranged to be wound around the compression coil spring 90 as viewed in the thickness direction.

The heat sensitive surface 62C of the thermostat 62 is in contact with the second surface 10B of the heater 10. With this configuration, the thermostat 62 can accurately detect that a temperature of the heater 10 has elevated up to a threshold value or higher.

As illustrated in FIGS. 18A and 18B, the cable guide 200 retaining the cable 70 includes the partitioning wall 230 positioned between at least a part of the cable 70 and the support wall 31 of the holder 30 in the thickness direction. With this configuration, abutment between the cable 70 and the support wall 31 can be suppressed. Specifically, the partitioning wall 230 can restrict the cables 72, 73 from making contact with the support wall 31.

The partitioning wall 230 is arranged to extend in a region corresponding to the heat-generating region 10H in the long-side direction. This confiscation can suppress contact of the cables 72, 73 with a portion of the support wall 31 whose temperature tends to be high.

The cable guide 200 supports the center thermistor cable 72 and the thermostat cables 73 at a position spaced apart from the support wall 31 in the heat-generating region 10H. The cable guide 200 can thus restrict contact of the cables 72, 73 with the high temperature portion of the support wall 31.

Each end portion of the cable guide 200 is positioned outside the heat-generating region 10H in the long-side direction, and holds one of the center thermistor cable 72 and the thermostat cables 73 to be separated from the support wall 31. This configuration can suppress contact of the cables 72, 73 with the support wall 31 outside the heat-generating region 10H in the long-side direction.

The cable guide 200 supports the center thermistor cable 72 at a position opposite the support wall 31 with respect to the torsion coil spring 80A in the thickness direction. With this configuration, a part of the center thermistor cable 72 extending near the torsion coil spring 80A can be held at a position farther away from the heater 10 than the torsion coil spring 80A is from the heater 10 in the thickness direction.

The cable guide 200 supports the thermostat cables 73 at a position opposite the support wall 31 with respect to the torsion coil spring 80B in the thickness direction. With this configuration, a part of the thermostat cables 73 extending near the torsion coil spring 80B can be supported at a position farther away from the heater 10 than the torsion coil spring 80B is from the heater 10 in the thickness direction.

The cable guide 200 has the through-hole 240 through which the compression coil spring 90 extends in the thickness direction. Hence, the cable guide 200 is not urged by the compression coil spring 90 toward the heater 10. With this configuration, the cables 72, 73 supported by the cable guide 200 can be restricted from making contact with the support wall 31 of the holder 30 more reliably.

The cable guide 200 includes the cable restricting parts 250 that function to restrict displacement of the cables 72, 73 toward the stay 40 in the thickness direction. This configuration can restrain contact of the cables 72, 73 against the stay 40.

The plurality of cable restricting parts 250 is arrayed in the long-side direction as viewed in the thickness direction. This structure can further reliably suppress contact of the cables 72, 73 against the stay 40.

As illustrated in FIGS. 19A and 19B, the cable guide 200 further includes the stay abutment parts 260. With this structure, the stay abutment parts 260 can abut on the stay 40 even in a case where the cable guide 200 is deformed toward the stay 40, thereby suppressing further deformation of the cable guide 200.

The plurality of stay abutment parts 260 are arrayed in the long-side direction, thereby more efficiently suppressing deformation of the cable guide 200.

The first through fourth holder abutment parts 271A-271D are positioned around the side thermistor 61A as viewed in the thickness direction, so that the center thermistor cable 72 supported by the cable guide 200 can be restricted from coming into contact with the side thermistor 61A. Further, since the fifth through eighth holder abutment parts 272A-272D are positioned around the thermostat 62 as viewed in the thickness direction, the center thermistor cable 72 supported by the cable guide 200 can be restricted from coming into contact with the thermostat 62. Further, since the ninth through twelfth holder abutment parts 273A-273D are positioned around the center thermistor 61B as viewed in the thickness direction, the thermostat cables 73 supported by the cable guide 200 can be restricted from coming into contact with the center thermistor 61B.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

In the above-described embodiment, the first positioning part 341 has the first groove 341A with which the first arm part 82 of the torsion coil spring 80 is fitted. As a modification, the first positioning part 341 may have a through-hole with which the first arm part 82 of the torsion coil spring 80 is fitted. Alternatively, the first positioning part 341 may have a pair of protrusions such that the first arm part 82 of the torsion coil spring 80 is fitted between the protrusions for positioning of the first arm part 82 in the short-side direction. The same modifications may also be applied to the second positioning part 342.

In the above-described embodiment, the first wall 371 of the holder 30 has the recessed portion 371A, and the cover 100 has the protruding portion 150 (see FIG. 14). Alternatively, the first wall 371 may have a protruding portion protruding toward the cover 100, and the cover 100 may have a recessed portion with which the protruding portion of the first wall 371 is fitted.

In the above-described embodiment, the first wall 371 having the recessed portion 371A is employed for positioning the cover 100 relative to the holder 30. Alternatively, four protruding parts protruding from the holder 30 may be provided, so that the cover 100 can be fitted with the four protruding parts in a similar manner as the element positioning part 140 (see FIG. 11). Still alternatively, a pair of walls may be arranged on the holder 30 to face each other in the long-side direction, so that the cover 100 is fitted between the pair of walls in the long-side direction to fix the position of the cover 100 relative to the holder 30 in the long-side direction.

In the above-described embodiment, the element positioning part 140 is configured of four protruding parts, i.e., the first protruding part 141A, the second protruding part 141B, the third protruding part 142A, and the fourth protruding part 142B. Alternatively, the element positioning part 140 may be configured by two wall-like fitting parts facing each other in the long-side direction, for example. In this modification, the thermostat 62 is fitted between the two fitting parts to fix the position of the thermostat 62 in the long-side direction relative to the cover 100.

Still alternatively, the element positioning part 140 may be configured by a protruding portion provided on one of the cover 100 and the thermostat 62, and a recessed portion provided on a remaining one of the cover 100 and the thermostat 62. In this modification, the protruding portion and the recessed portion are fitted with each other to fix the position of the thermostat 62 in the long-side direction relative to the cover 100. Here, the protruding portion protrudes in a direction perpendicular to the long-side direction.

In the above-described embodiment, the cover 100 includes the pair of first protrusions 161. However, the number of the first protrusions 161 need not be two, but may be one, or not less than three. The same is true with respect to the second protrusions 162 of the cover 100. Further, the number of the first protrusions 161 may be the same as or different from the number of the second protrusions 162. Still further, the positions of the first protrusions 161 may be the same as or different from the positions of the second protrusions 162 with respect to the long-side direction.

The cover 100 may not include the first and the second protrusions 161 and 162. In this case, the cover 100 may be fitted between the first wall 371 and the second wall 372 in the short-side direction to realize positioning of the cover 100 in the short-side direction relative to the holder 30.

In the above embodiment, the positioning of the thermostat 62 in the short-side direction relative to holder 30 is provided by: fitting engagement of the thermostat 62 between the first cover wall 110 and the second cover wall 120 of the cover 100; abutment of the first protrusions 161 with the first wall 371; and abutment of the second protrusions 162 with the second wall 372. However, positioning of the thermostat 62 in the short-side direction relative to the holder 30 may be realized through other structures.

Here, one possible alternative structure may be described with reference to FIG. 12. For example, the position of the thermostat 62 in the short-side direction relative to the holder 30 may be fixed simply by fitting engagement of the heat-sensitive portion 62B of the thermostat 62 with the second through-hole 361 of the holder 30. With this configuration, simply fitting the thermostat 62 with the second through-hole 361 of the holder 30 can realize the positioning of the thermostat 62 relative to the holder 30 in the short-side direction.

In the above-described embodiment, the cable guide 200 includes the plurality of stay abutment parts 260. However, the cable guide of the disclosure may have only one stay abutment part. Further, the cable guide of the disclosure may not have any stay abutment part.

In the above-described embodiment, the cable guide 200 includes the plurality of cable restricting parts 250 (251-257). However, the cable guide of the disclosure may have only one cable restricting part. Still alternatively, the cable guide of the disclosure may not have any cable restricting part.

In the above-described embodiment, the torsion coil springs 80 are employed as the first urging member of the disclosure. Alternatively, the first urging member of the disclosure may be a compression coil spring, or a leaf spring.

In the above-described embodiment, the urging direction of the compression coil spring 90 is parallel to the thickness direction of the base plate 11. However, the urging direction of the compression coil spring 90 may not be parallel to the thickness direction of the base plate 11. In other words, the urging direction of a compression coil spring of the disclosure may be a direction crossing the thickness direction of the base plate 11.

In the above-described embodiment, the compression coil spring 90 is used for urging the thermostat 62 toward the heater 10. Alternatively, an urging member other than a compression coil spring, such as a torsion coil spring or a leaf spring, may be employed for urging the thermostat 62 toward the heater 10. Here, preferably, a portion of the urging member urging the thermostat 62 be overlapped with the heat-sensitive surface 62C (the heat-sensitive portion 62B) of the thermostat 62 as viewed in the urging direction. For example, in a case where a torsion coil spring having a coil part and two arm parts is employed as the urging member, one of the arm parts urging the thermostat 62 be preferably overlapped with the heat-sensitive surface 62C (the heat-sensitive portion 62B) as viewed in the urging direction.

Incidentally, the portion of the urging member urging the thermostat 62 may not be overlapped with the heat-sensitive surface 62C (the heat-sensitive portion 62B) as viewed in the urging direction. For example, the urging member may be configured of two compression springs, namely, a first compression coil spring and a second compression coil spring. In this case, referring to FIG. 13, the first compression coil spring may urge a part of the cover 100 toward the heater 10 on the one side of the heat-sensitive surface 62C (the heat-sensitive portion 62B) in the long-side direction, such that the first compression coil spring is not overlapped with the heat-sensitive surface 62C (the heat-sensitive portion 62B) as viewed in the urging direction. Likewise, the second compression coil spring may urge another part of the cover 100 toward the heater 10 on the other side of the heat-sensitive surface 62C (the heat-sensitive portion 62B) in the long-side direction, such that the second compression coil spring is not overlapped with the heat-sensitive surface 62C (the heat-sensitive portion 62B) as viewed in the urging direction.

In the above-described embodiment, the compression coil spring 90 urges the thermostat 62 toward the heater 10 through the cover 100. However, the compression coil spring of the disclosure may directly urge the thermostat 62 toward the heater 10 without intervention of the cover 100.

In the above-described embodiment, the thermistor 61 is used as a temperature sensing element (temperature sensor). Alternatively, a thermocouple, or a semiconductor temperature sensor, and the like may also be used as the temperature sensor. Further, while the thermostat 62 is used as the protection element in the described embodiment, a temperature fuse may be available as the protection element. Still further, the heat-sensitive surface of the protection element may be in contact with the second surface 10B of the heater 10 through a member like the soaking plate 65 of the embodiment. Still further, the temperature sensor and the protection element may be in direct contact with the second surface 10B of the heater 10, or may directly face the second surface 10B of the heater 10 with a gap therebetween without intervention of any other component positioned in the gap.

Parts and components employed in the above-described embodiment and modifications may be suitably selected and combined together.

What is claimed is:

1. A heating unit comprising:

a heater having a first surface and a second surface opposite each other, the heater including:

a base plate elongated in a long-side direction and having a thickness in a thickness direction perpendicular to the second surface; and a resistance heating element provided on the base plate, the resistance heating element being provided to extend in a heat-generating region in the long-side direction;

an endless belt circularly movable around the heater, the endless belt having an inner peripheral surface in contact with the first surface of the heater;

a temperature sensing element configured to detect a temperature of the heater and arranged to face the second surface of the heater in the thickness direction;

a cable connected to the temperature sensing element;

a holder holding the heater and the temperature sensing element, the holder including a support wall supporting the second surface of the heater; and a cable guide holding the cable, the cable guide including a partitioning wall positioned between at least a part of the cable and the support wall in the thickness direction, wherein the cable guide has two end portions, both in the long-side direction, both end portions being positioned outside of the heat-generating region in the long-side direction.

2. The heating unit according to claim 1, wherein the partitioning wall is provided at least in such a region corresponding to the heat-generating region in the long-side direction.

3. The heating unit according to claim 2, wherein the cable guide holds the cable such that the cable is separated away from the support wall at least within the heat-generating region in the long-side direction.

4. The heating unit according to claim 3, wherein both end portions of the cable guide respectively hold the cable such that the cable is separated away from the support wall in the thickness direction.

5. The heating unit according to claim 1, further comprising a first urging member, wherein the temperature sensing element comprises a first temperature sensing element and a second temperature sensing element, the first urging member urging the first temperature sensing element toward the heater, wherein the cable comprises a first cable connected to the first temperature sensing element and a second cable connected to the second temperature sensing element, and wherein the cable guide holds the second cable such that the second cable extends through a position opposite the support wall with respect to the first urging member in the thickness direction.

6. The heating unit according to claim 1, further comprising:

a compression coil spring urging the temperature sensing element toward the heater; and a stay supporting the holder and having a higher rigidity than the holder, the stay being positioned opposite the heater with respect to the holder in the thickness direction, wherein the compression coil spring is positioned between the stay and the temperature sensing element in the thickness direction, the compression coil spring having one end in contact with the stay, and wherein the cable guide has a through-hole through which the compression coil spring extends in the thickness direction.

7. The heating unit according to claim 6, further comprising a cover supporting the compression coil spring, wherein the compression coil spring urges the temperature sensing element toward the heater through the cover.

8. The heating unit according to claim 1, further comprising a stay supporting the holder, the stay being positioned opposite the heater with respect to the holder in the thickness direction, wherein the cable guide includes a cable restricting part positioned between the cable and the stay in the thickness direction and restricting the cable from moving toward the stay.

9. The heating unit according to claim 8, wherein the cable restricting part includes a plurality of restricting parts aligned in the long-side direction.

10. The heating unit according to claim 1, wherein the cable guide includes a plurality of holder abutment parts each in contact with the holder in the thickness direction, and wherein the holder abutment parts are arranged at least around the temperature sensing element.

11. The heating unit according to claim 1, further comprising a cover holding the temperature sensing element and the cable, wherein the cover is mounted on the holder such that the cable is separated away from the support wall in the thickness direction.

12. A heating unit comprising:

a heater having a first surface and a second surface opposite each other, the heater including:

a base plate elongated in a long-side direction and having a thickness in a thickness direction perpendicular to the second surface; and a resistance heating element provided on the base plate;

an endless belt circularly movable around the heater, the endless belt having an inner peripheral surface in contact with the first surface of the heater;

a temperature sensing element configured to detect a temperature of the heater and arranged to face the second surface of the heater in the thickness direction;

a cable connected to the temperature sensing element;

a holder holding the heater and the temperature sensing element, the holder including a support wall supporting the second surface of the heater; and a cable guide holding the cable, the cable guide including a partitioning wall positioned between at least a part of the cable and the support wall in the thickness direction, wherein the temperature sensing element comprises a thermistor and a thermostat, wherein the heater further includes a terminal electrically connected to the resistance heating element for supplying power thereto, wherein the cable comprises:

a thermistor cable connected to the thermistor, the thermistor cable extending toward one side in the long-side direction from the thermistor; and a thermostat cable connected to the thermostat, the thermostat cable extending toward another side in the long-side direction from the thermostat, and wherein the terminal is positioned at an end of the heater at the another side in the long-side direction.

13. A heating unit comprising:

a heater having a first surface and a second surface opposite each other, the heater including:

a base plate elongated in a long-side direction and having a thickness in a thickness direction perpendicular to the second surface; and a resistance heating element provided on the base plate;

an endless belt circularly movable around the heater, the endless belt having an inner peripheral surface in contact with the first surface of the heater;

a temperature sensing element configured to detect a temperature of the heater and arranged to face the second surface of the heater in the thickness direction;

a cable connected to the temperature sensing element;

a holder holding the heater and the temperature sensing element, the holder including a support wall supporting the second surface of the heater; and a cable guide holding the cable, the cable guide including a partitioning wall positioned between at least a part of the cable and the support wall in the thickness direction, the heating unit further comprising a stay supporting the holder and having a higher rigidity than the holder, the stay being positioned opposite the heater with respect to the holder in the thickness direction, wherein the cable guide includes a stay abutment part protruding toward the stay in the thickness direction and configured to abut on the stay in the thickness direction.

14. The heating unit according to claim 13, wherein the stay abutment part includes a plurality of abutment parts aligned in the long-side direction.

* * * * *